United States Patent
Covell et al.

(10) Patent No.: US 6,721,361 B1
(45) Date of Patent: Apr. 13, 2004

(54) VIDEO PROCESSING SYSTEM INCLUDING ADVANCED SCENE BREAK DETECTION METHODS FOR FADES, DISSOLVES AND FLASHES

(75) Inventors: Michele May Covell, Los Altos Hills, CA (US); Subutai Ahmad, Palo Alto, CA (US); Jeffrey Layne Edwards, Southlake, TX (US)

(73) Assignee: YesVideo.Com, San Jose, CA (US)

( * ) Notice: Subject to any disclaimer, the term of this patent is extended or adjusted under 35 U.S.C. 154(b) by 232 days.

(21) Appl. No.: 09/792,280

(22) Filed: Feb. 23, 2001

(51) Int. Cl.[7] ............................................... H04B 1/66
(52) U.S. Cl. ........................ 375/240.14; 375/240.16; 375/240.26; 348/700; 348/594; 348/595; 386/52; 386/53
(58) Field of Search .......................... 375/240.14, 240, 375/240.26, 240.16; 348/700, 699, 594, 595; 386/52, 53

(56) References Cited

U.S. PATENT DOCUMENTS

| | | | |
|---|---|---|---|
| 5,485,611 A | 1/1996 | Astle | 395/600 |
| 5,546,191 A | 8/1996 | Hibi | 358/335 |
| 5,635,982 A * | 6/1997 | Zhang et al. | 348/231 |
| 5,642,294 A | 6/1997 | Taniguchi | 364/514 |
| 5,767,922 A * | 6/1998 | Zabih et al. | 348/700 |
| 5,805,733 A | 9/1998 | Wang et al. | 382/232 |
| 5,818,439 A | 10/1998 | Nagasaka | 345/327 |
| 5,920,360 A * | 7/1999 | Coleman, Jr. | 348/700 |
| 5,974,218 A | 10/1999 | Nagasaka | 386/46 |
| 6,085,020 A | 7/2000 | Saito | 386/54 |
| 6,154,601 A * | 11/2000 | Yaegashi et al. | 386/52 |
| 6,154,771 A | 11/2000 | Rangan et al. | 709/217 |
| 6,185,363 B1 | 2/2001 | Dimitrova | 386/69 |

* cited by examiner

*Primary Examiner*—Shawn S. An
(74) *Attorney, Agent, or Firm*—Fish & Richardson P.C.

(57) ABSTRACT

The invention provides a method and apparatus for detecting a scene transition in digitized video data. The method includes determining if a gradual transition is detected in the video data that ends with a current frame based at least on the current frame and one or more previous frames in the digitized video data. The gradual transition has a length. The method includes comparing the gradual transition to a synthetically produced gradual transition spanning a same length and generated from starting and ending frames associated with the detected gradual transition and marking the detected gradual transition only if the detected gradual transition is sufficiently similar to the synthetically produced gradual transition.

42 Claims, 13 Drawing Sheets

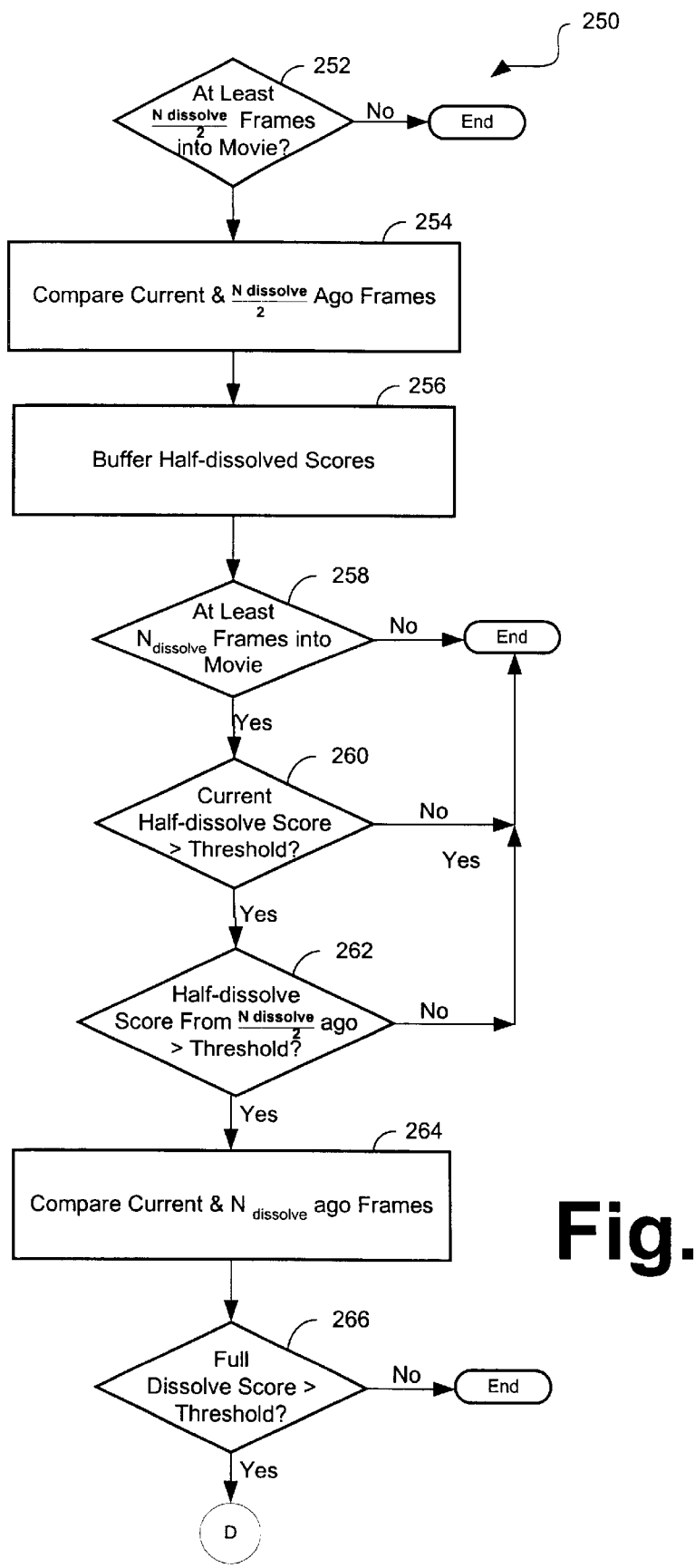
Fig. 2d (1/2)

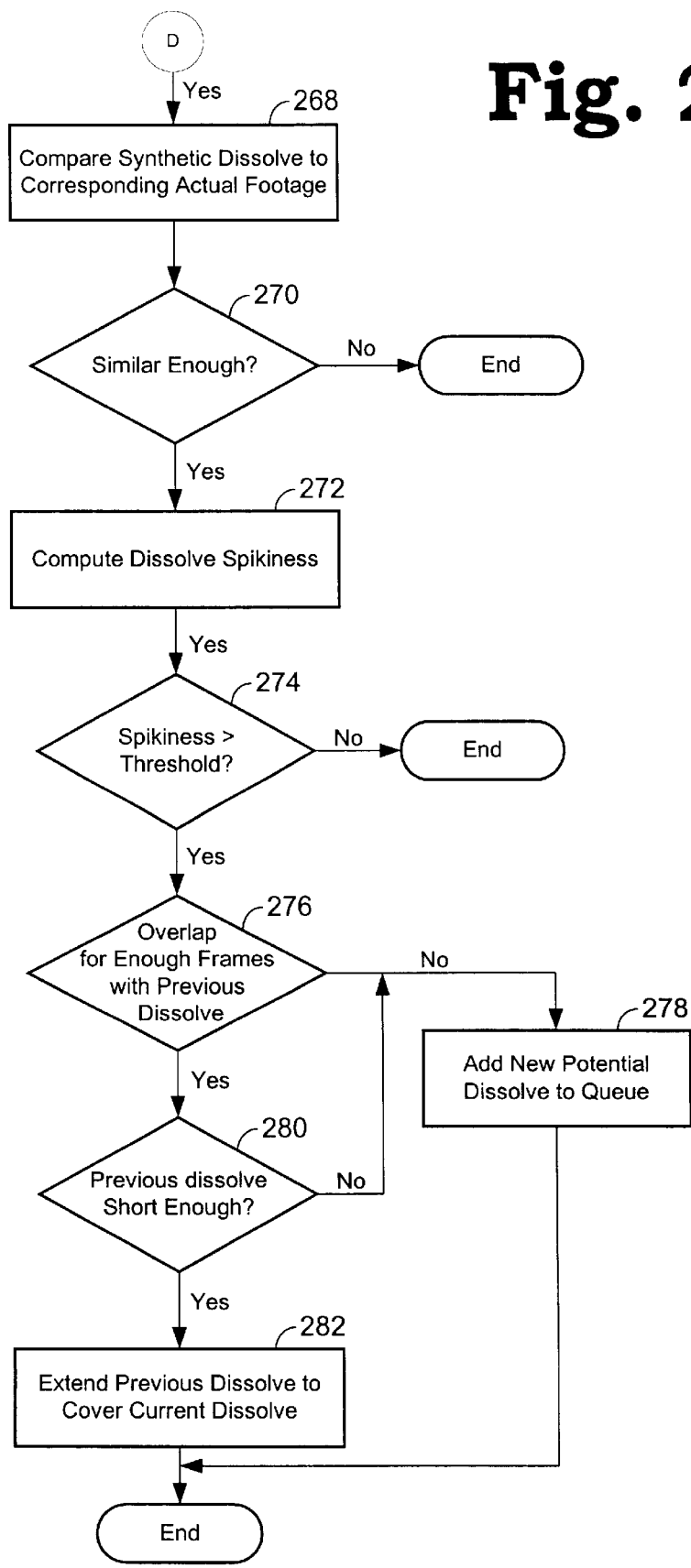
Fig. 2d (2/2)

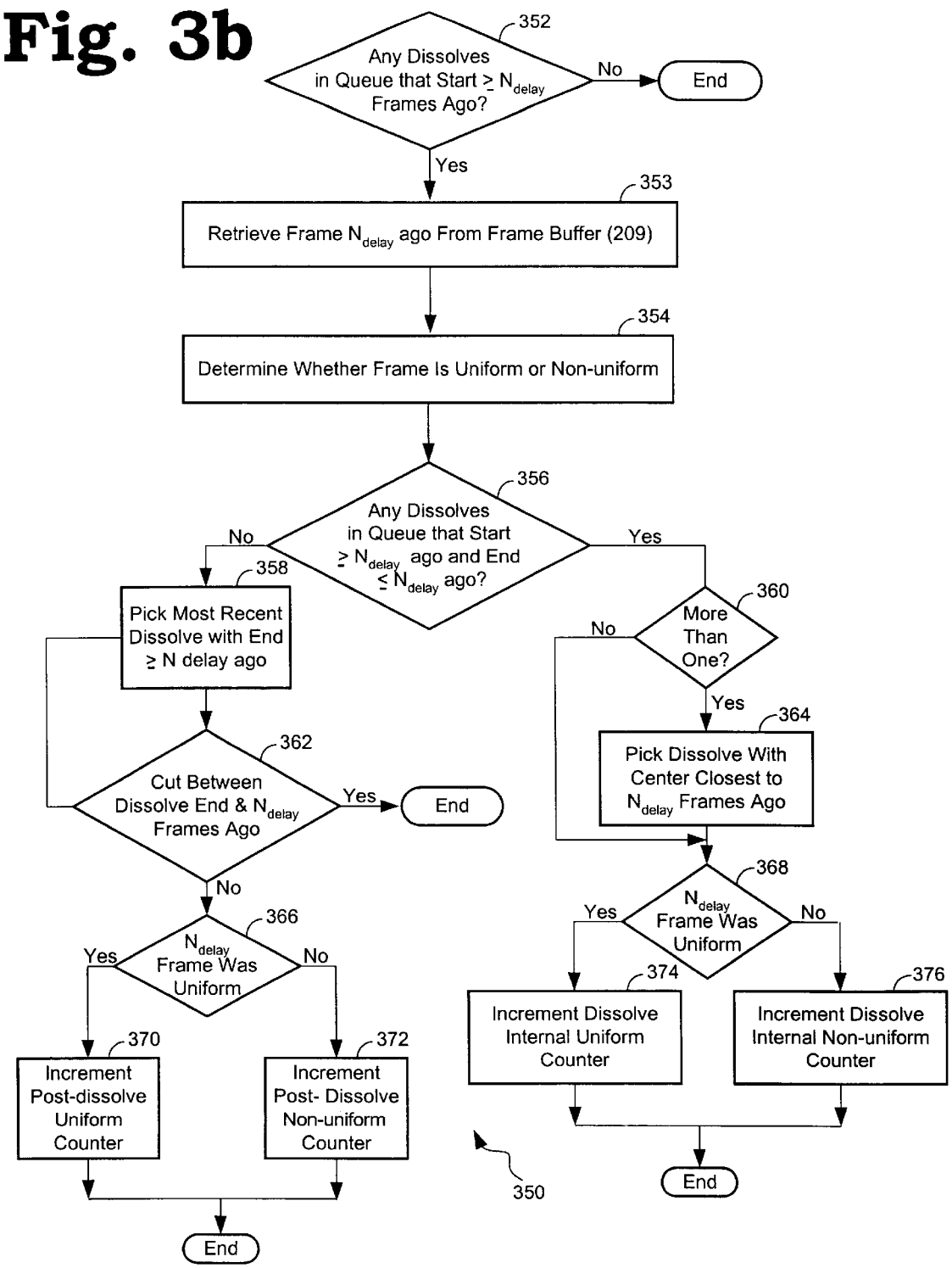

VIDEO PROCESSING SYSTEM INCLUDING ADVANCED SCENE BREAK DETECTION METHODS FOR FADES, DISSOLVES AND FLASHES

TECHNICAL FIELD

The present invention relates generally to methods and apparatus for collecting, editing and distributing video content.

BACKGROUND

Video camcorders have been around for many years and provide non-professional users an easy and an inexpensive mechanism for capturing life moments. Conventional video footage recorded by non-professional users suffers from three major problems that have no practical solutions. The longevity of a conventional videotape is approximately 10 years, after which the tapes degrade rather quickly. Homeowners and renters alike typically store video tapes in non-secure storage means that are susceptible to theft and damage (e.g., fire, flood and other natural disasters). Finally, most videotape recorded by conventional non-professional users includes more junk than real footage. That is, non-professional users of camcorders tend to not set up their shots and as such over record, creating undesirable junk footage. Conventional editing tools, where available, are difficult to use and very time consuming. As such, most non-professional users keep all of the raw footage on tape without editing out the junk.

Conventional solutions to these problems are either inadequate or too expensive. Tape to tape duplication services are available, but costs are not trivial and the duplicate tapes suffer from the same limitations discussed above. Professional encoding of videotapes to optical disks is very expensive typically on the order of magnitude of $60/min. Home equipment for digital encoding and editing, where available, is expensive and time consuming to operate.

SUMMARY

In one aspect the invention provides a method for detecting a scene transition in digitized video data including acquiring digitized video data from a source and evaluating a frame at a time the video data. For each frame, the method determines if a cut is detected between the current frame and a previous frame. More frames in the digitized video data are processed to determine if the detected cut is part of a long flash. Detected cuts that are not long flashes are marked.

Aspects of the invention can include one or more of the following features. The step of processing more frames can include processing a predetermined number of frames including a last frame. The processing can include comparing each frame including the last frame to the previous frame, and if any of the frames are sufficiently similar to the previous frame, then declaring the detected cut a long flash and not marking the detected cut. Comparing frames can include comparing a color, motion or score difference between the frames. Comparing the frames can include deriving a score representative of the similarity of the compared frames. The score can be derived from a mathematical comparison of the frames considering at least one parameter. The score can be a product of the color and motion differences between the respective frames or a weighted mean of the color and motion differences between the respective frames.

In another aspect, the invention provides a method for detecting a scene transition in digitized video data and includes determining if a dissolve is detected in the video data that ends with a current frame based at least on the current frame and one or more previous frames in the digitized video data. The dissolve has a predefined length. The method includes comparing the dissolve to a synthetically produced dissolve spanning a same length and generated from starting and ending frames associated with the detected dissolve. The detected dissolve is marked only if the detected dissolve is sufficiently similar to the synthetically produced dissolve.

Aspects of the invention can include one or more of the following features. The step of comparing can include comparing a subset of all of the frames in the detected dissolve to the frames in the synthetically produced dissolve. The step of determining can further include evaluating a previously processed frame at a distance a half dissolve from the current frame and a full dissolve from the current frame including determining if the current frame is sufficiently different from both the frame located a half dissolve length ago and a full dissolve length ago. The step of determining can include evaluating previously processed frames, a first frame at a distance a half dissolve from the current frame and a second frame at a distance a full dissolve from the current frame, including determining if the current frame is sufficiently different from both the first and second frames; and marking the detected dissolve only if the current frame is sufficiently different from the first and second frames.

Prior to marking, the method can further include determining if the detected dissolve overlaps a previously detected dissolve, and if so, combining the overlapping dissolves. The determining step can include hypothesizing where the detected dissolve starts and ends including identifying starting, middle and ending frames, comparing the starting, middle and ending frames to determine if each is sufficiently different from the others and, if the frames are sufficiently different, marking the detected dissolve.

In another aspect, the invention provides a method for detecting a fade in digitized video data and includes detecting a first transition in the digitized video data, detecting a second transition within a pre-set number (Nfade) of frames from an end of the first transition, determining if the frames intermediary between the first and second transitions are substantially uniform and marking the first and second transition as a single fade transition.

Aspects of the invention can include one or more of the following features. The first transition can be a dissolve and the second transition can be a cut or a dissolve. The step of comparing intermediary frames can include determining a number of frames between the first and second transitions. If the number of frames exceeds a predetermined number, each of the first and second transitions are marked without marking a fade transition. The step of comparing intermediary frames can include determining if a minimum number of uniform frames exist between the first and second transitions. If the number of uniform frames does not exceed a predetermined number, each of the first and second transitions is marked without marking a fade transition.

The step of comparing intermediary frames can include determining a ratio of non-uniform frames to uniform frames between the first and second transitions. If the ratio exceeds a predetermined number, each of the first and second transitions is marked without marking a fade transition.

In another aspect, the invention provides a method for detecting a compound transition in digitized video data and includes detecting a first transition in the digitized video data, detecting a second transition within a pre-set number (Nfade) of frames from the first transition, determining if the frames intermediary between the first and second transitions are substantially uniform and marking the first and second transition as a compound transition.

In another aspect, the invention provides a method for detecting a scene transition in digitized video data and includes determining if a gradual transition is detected in the video data that ends with a current frame based at least on the current frame and one or more previous frames in the digitized video data. The gradual transition has a length. The method includes comparing the gradual transition to a synthetically produced gradual transition spanning a same length and generated from starting and ending frames associated with the detected gradual transition and marking the detected gradual transition only if the detected gradual transition is sufficiently similar to the synthetically produced gradual transition.

Aspects of the invention can include one or more of the following features. The gradual transition can be selected from the group of a dissolve, a wipe, a page flip, a tear, an iris transition and a pixelation transition.

Aspects of the invention can include one or more of the following advantages. An efficient and inexpensive system is provided for collecting, digitizing and editing video content. The system includes digitizing equipment for digitizing analog and digital video input for distribution over the Internet. The system includes scene detection mechanisms for parsing the digitized content into plural scenes that can then be edited or otherwise manipulated by the user. The scene detection mechanisms include methods for detecting individual scene transitions as well as composite scene breaks, such as fades. The system includes methods for identifying and marking cuts and dissolves including comparing dissolves to synthetically produced dissolves. The marking process includes timeout checks and methods for marking a correct transition in a composite scene break. The system includes methods for detecting short and long flashes so as to avoid mis-marking scenes.

These and other advantages will be evident from the description below, the claims and the attached drawings.

BRIEF DESCRIPTION OF THE DRAWINGS

FIG. 2d is a flow diagram of a method for pre-screening dissolves.

FIG. 3b is a flow diagram of a method for updating the dissolve queue.

DETAILED DESCRIPTION

As used herein the term "Video Data" refers to an image stream, audio stream or synchronized image and audio stream.

"Physical media," as used herein, refers to means for storing digitized content and can include a video disc, floppy disc, zip drive, minidisc, magnetic tape, CD-ROM, VCD and DVD.

"Segment," as used herein, refers to a definable portion of video data. Tools described below can be used to locate segments of the video data. Portions of the description below are described with reference to a scene. A scene is a type of segment often associated with an image stream. While the description sets forth particular details of scene detection and other scene features, those of ordinary skill in the art will recognize that the invention is equally suited to process other video data types.

"Cut," as used herein, refers to an abrupt (single frame) transition between two pieces of video footage.

"Fade," as used herein, refers to a smooth transition to a uniform color field followed by a smooth transition to video footage.

"Dissolve," as used herein, refers to a cross-fade between two pieces of video footage.

"Uniform," when describing a frame as used herein, refers to an image that has only a small number of pixels that vary significantly from the average color of the frame. When used in association with a video segment (e.g., a uniform video segment), most of the frames included in the segment are uniform, (i.e., none of the frames in the segment are significantly different from their neighbors) and that the average color of each frame is nearly constant across all frames of the video segment.

"Garbage," as used herein, refers to the typically blue-screened frames and to segments containing the blue-screen frames that are output by a conventional videocassette recorder (VCR) when no video signal is present. "Garbage," when describing a frame, is used to refer to an image that is uniform and that has a clue color similar to that generated by a conventional VCR when the tape it is playing does not have a valid video signal. Similarly, when describing a segment, garbage means most frames in the segment are garbage frames and that the color (e.g., of blue) that is the frame average for each of these garbage frames does not vary significantly across the duration of the segment.

Figure 1:
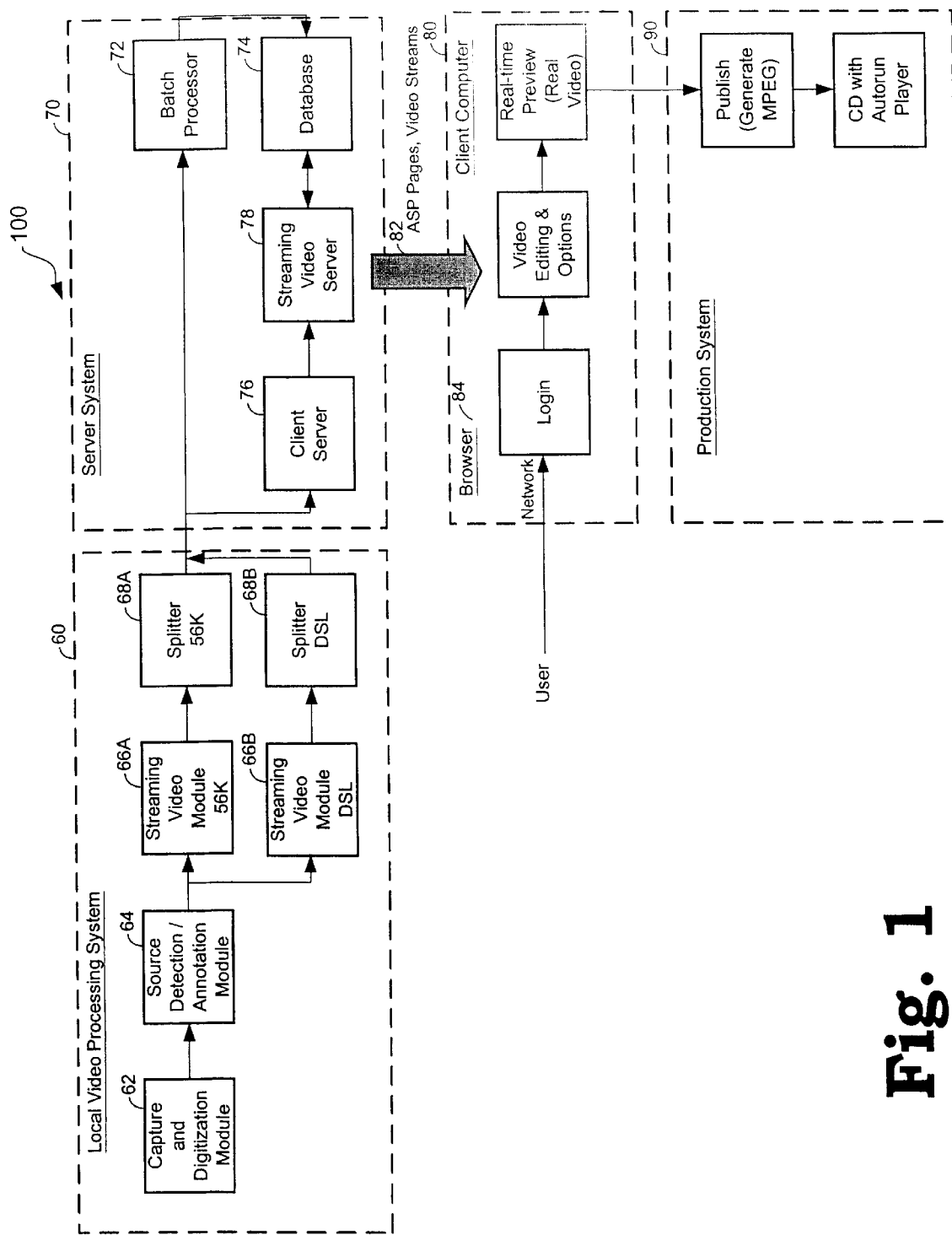
FIG. 1 is a schematic block diagram of a system for capturing, editing and distributing video content.

Referring now to FIG. 1, a system 100 is shown for capturing, editing and distributing video content. The system 100 includes a local video processing system 60 and server system 70. Local video processing system 60 captures and digitizes content and provides digitized video to server system 70. Server system 70 maintains a database 74 of digitized video and one or more servers. Database 74 may itself be a database server that includes one or more storage means for storing streaming and high-resolution video and other data. The servers execute one or more applications to host video editing services as will be described in greater detail below. Server system 70 includes a website that can be accessed to retrieve, manipulate, order and distribute digitized video to one or more distributees. The details of the website, editing tools and distribution services provided by server system 70 is described in greater detail below.

Server system 70 can be linked to by a user using a client computer 80 via a network 82 (e.g., the Internet). The user can login, review and edit video that has been captured, combine the captured/edited content with other media and preview the results (i.e., a storyboard) in real time. For the purposes of these discussions, a "storyboard" is a working area presented by a user interface provided by server system 70 to the user operating client computer 80. One or more scenes are added to the storyboard as the user develops a finished product referred to as an album. An album includes a name and a representative still. Albums can be edited and eventually published. Publication can include the creation of a high-resolution version of the digitized content and may include the production of a physical manifestation of the digitized content (physical media) for distribution to one or more distributees. Alternatively, an album can be published on-line and viewed by others in a streaming format.

In one implementation, the user can view a streaming video version of the digitized content stored in the database 74 in server system 70. Streaming video server 78 can download to the user via the network 82 a streaming version of a scene, storyboard or album. The streaming video version can be a low-resolution version of the original digitized content stored in the database 74. After the user has reviewed and/or modified a storyboard, the user can use a browser 84 to order a physical manifestation of the storyboard/album. The user can also allow others to access an album or distribute multiple copies of the physical manifestation to other distributees. The processes invoked by the browser 84 are described in greater detail below.

System 100 includes a production system 90 that is used to produce a published version of a selected album as well as produce the physical manifestations of the album for distribution to the distributees. The published version of the album can be a high resolution, streaming or other version of the original digitized video content that is stored in the database 74 of the server system 70. In addition to the delivery of a physical manifestation of the digitized content, an information stream can be produced to deliver a version of the content to the distributees. The information stream can be delivered by a delivery system such as the World Wide Web using an internet enabled set top box (using the file transfer protocol ftp), DVD player or personal computer, a cable system incorporating a video-on-demand set top box, or satellite system (satellite narrowcast). These and other delivery systems can be used to deliver a streaming version of the digitized content.

Local Video Processing System

Local video processing system 60 includes a capture and digitization module 62, a scene detection/annotation module 64, one or more streaming video processors 66, splitters 68 and local storage 69 (not shown).

A. Capture and Digitization Module

Figure 2A:
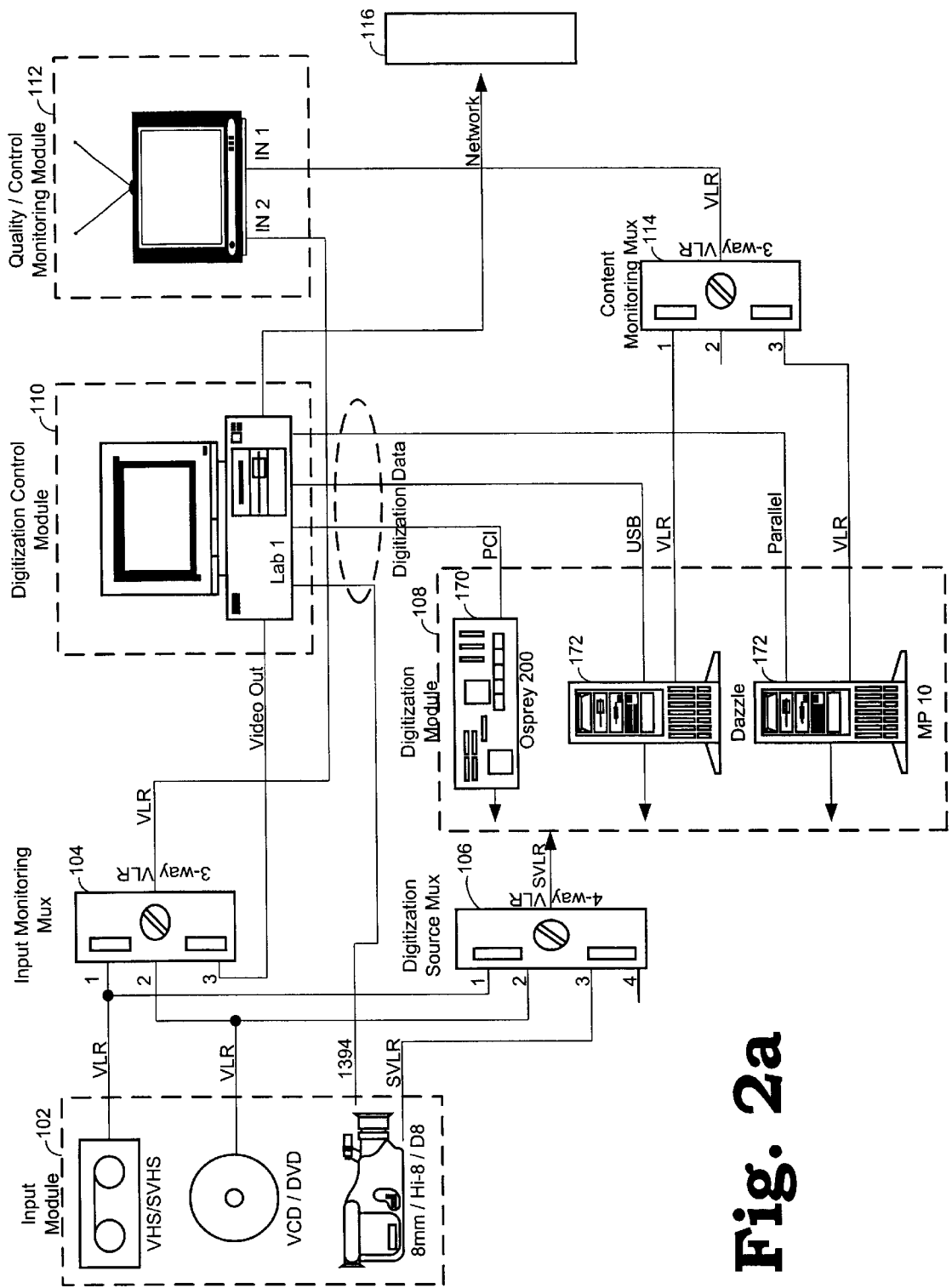
FIG. 2a is a block diagram of a capture and digitization module.

Referring now to FIG. 2*a*, capture and digitization module 62 includes an input module 102, an input monitoring multiplexor 104, a digitization source multiplexor 106, a digitization module 108, a digitization control module 110, content monitoring module 112, content monitoring multiplexor 114 and network connection 116 for interfacing with a network (e.g., local area network (LAN), intranet, Internet) that couples the digitization module 62 and the rest of the local video processing system 60.

Input module 102 includes plural means for reading input received from a user. Input can be received from a user by US Mail, delivery (e.g., FedEx, UPS), through a designated receiving site (e.g., a drop off center, kiosk, photo shop), or can be uploaded directly by the user. Input can be analog or digital. If the input has already been digitized, then the input can be provided directly to digitization control module 110. Otherwise, all other forms of input are digitized using digitization module 108. In one implementation, input module 102 includes a video cassette player (VHS, SVHS or 8 mm format), a compact disc player (video compact disc (VCD) and digital video compact disc (DVD)) and a camcorder for reading input. Input can be of the form of analog or digital tape (VHS, SVHS or 8 mm tape), VCDs, DVDs or direct input from a video recording device such as a 8 mm HI-8 camcorder. Input module 102 provides as an output plural input streams, one from each input device, that can be passed to both the input monitoring multiplexor 104 and digitization source multiplexor 106. Alternatively, the input module input stream can be coupled directly to the digitization control module 110 using a FireWire connection (IEEE-1394 interface) or other direct input means.

Input monitoring multiplexor 104 receives as inputs a video stream on each of its input ports and provides a single selected stream as an output on its output port. In one implementation, input monitoring multiplexor 104 receives as inputs two video streams from the input module (a stream from a video cassette player and a compact disc player) and a feedback stream from the digitization control module 110. The output of the input monitoring multiplexor 104 is coupled to an input of the content monitoring module 112. In this way, the video output from each input device can be viewed by a quality control monitor for the system.

Digitization source multiplexor 106 receives as inputs video streams on each of its input ports and provides a single selected stream as an output on its output port. In one implementation, digitization source multiplexor 106 receives as input three video streams from the input module (one from each of the video cassette player, compact disc player and camcorder). The output of the digitization source multiplexor 106 is coupled to the input of digitization module 108. In this way, the video output stream from each input device can be selected for digitization by the digitization module 108.

Digitization module 108 can include plural devices for digitizing the video input received from the input module 102. In one implementation, digitization module includes a controller 170 (e.g., an Osprey 200 video capture card available from ViewCast.com), and two digitizers 172 (a Digital Video Creator available from Dazzle Multimedia and Studio MP10 available from Pinnacle Systems). Each device (controller 170 and digitizers 172) is coupled by a bi-directional communications bus to the digitization control module 110. In one implementation, controller 170 is included as part of digitization control module 110.

Digitization control module 110 controls the configuration and selection of the devices in the digitization module 108. Depending on the configuration, one or more of the devices will operate on the video stream received from the digitization source multiplexor 106 and provide output to both the content monitoring multiplexor 114 and the digitization control module 110. In one implementation, each digitizer 172 provides a digitized stream that contains the digitized video as an output to the digitization control module 110. In addition, the digitized content can be rendered to produce a video stream that is provided as an output to content monitoring multiplexor 114.

Digitization control module 110 can also perform a synchronization function for the data transfers between the digitization module 108 and input module 102. Digitization control module 110 can activate input module 102 and digitization module 108 in an appropriate sequence so that output of input module 102 can feed into the input of digitization module 108 without any human intervention.

Content monitoring multiplexor 114 receives as inputs a video stream on each of its input ports and provides a single selected stream as an output on its output port. In one implementation, content monitoring multiplexor 114 receives as inputs two video streams from the digitization module (a stream from each digitizer 172). The output of the content monitoring multiplexor 114 is coupled to a second input of the content monitoring module 112. In this way, the video output from each digitizer 172 can be viewed by a quality control monitor for the system.

Content monitoring module 112 includes a video monitor for viewing video streams processed by the system 100. In one implementation, the content monitoring module 112 includes two inputs, one from the digitization module 108 and one from the input module 102 (via their respective multiplexors).

Digitization control module 110 controls the operation of the digitization module 108. Digitization control module 110 receives as an input a digitized video stream that can be manipulated for further processing. Digitization control module 110 associates with each processed digitized stream a video identifier (ID) associated with the source (user) of the input. The output from digitization control module 110 (a digitized video stream) is coupled by network connection 116 to the remaining portions of the local video processing system 60. In one implementation, the digitized video stream is encoded prior to output. In one implementation, the output format is an MPEG format.

In one implementation, digitization control module 110 can add information to the digitized video prior to transfer to the remaining portion of the local video processing system 60. For example, production screens or customized title screens can be added to the digitized video to indicate the source of origin of the digitization services.

The digitized content produced in the local video processing system 60 can be stored locally in a local storage (not shown), on disc or other physical media.

B. Scene Detection/annotation Module

Referring again to FIG. 1, scene detection/annotation module 64 includes an algorithm for detecting scene changes in the digitized video. Scene detection/annotation module 64 receives as an input the digitized stream from the capture and digitization module 62 (e.g., the MPEG file) and provides as an output scene information. In one implementation, scene annotation includes scene identification information, bad video segment information as well as a representative still image for the scene. In one implementation, the scene detection/annotation module 64 provides as an output a JPEG still for each scene.

i. Scene Detection

Figure 2B:
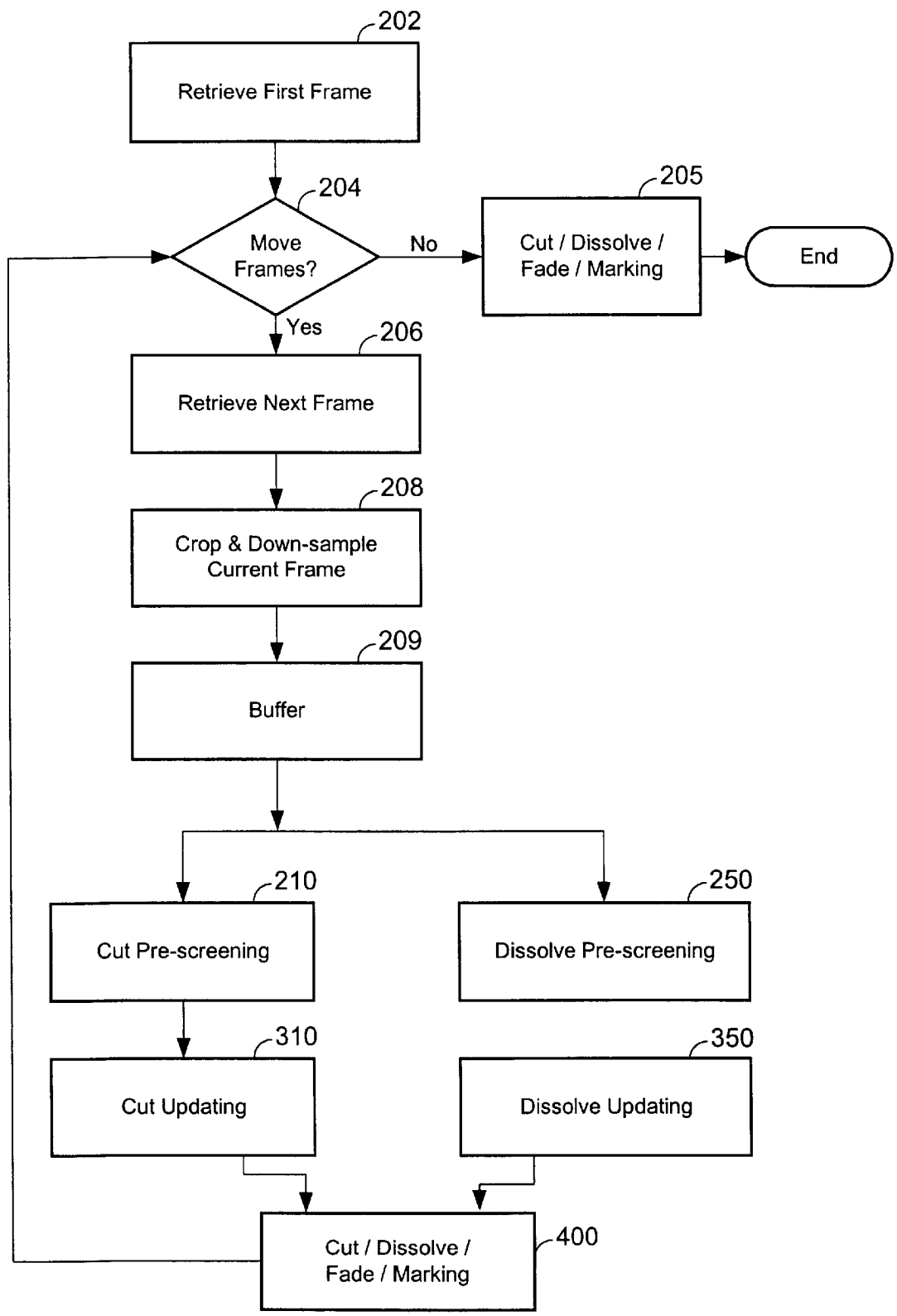
FIG. 2b is flow diagram of a method for detecting scenes in a digitized video.

Referring now to FIG. 2b, a method 200 invoked by the scene detection/annotation module 64 for detecting scenes, or more specifically, scene transitions, in the digitized content is shown. Scene transitions can be of two basic types, cuts and gradual transitions. A cut is a sudden transition between two video segments. A cut can arise where the video camera was turned off and back on or where two noncontiguous video segments abut as a result of an after-filming editing process. A gradual transition is a transition between two video segments over a series of frames. Gradual transitions can be due to an in-camera effect, when the camera supports that type of operation. The camera operator, in effect, records one segment, rewinds some distance, then uses the camera menu to select the type of gradual transition to be used. Thereafter, the camera user can record a second segment. The camera will merge the two overlapping portions of footage in the type of transition that has been selected. Another way that gradual transitions are introduced into the footage is through the use of after-camera editing processes.

A dissolve is one example of a transition over a series of frames. A dissolve cross-fades from a first video segment to a second video segment. A fade is another example of a transition over a series of frames. A fade includes two distinct transitions, one from a first video footage segment to a constant color frame and then a second transition from a constant color frame to a new video footage segment. The present invention includes means for recognizing different types of scene breaks. It also includes methods for determining which frame in the video footage associated with a scene break is identified as the start of a new scene.

The method begins by retrieving a first image frame (202). If no more frames are to be processed (204), the module calls a marking routine to process the outstanding cuts, dissolves, and fades that are still in their respective "not-yet-marked" queues (205) and then ends. The process of marking cuts, fades and dissolves is discussed in greater detail below. Else, the next image frame is retrieved (206). The current image frame is cropped and downsampled (208). The image frame is cropped to include only the interior portion of the image area since the outside boundary may contain camera noise. Where the image frame dimensions are width (W) by height (H) (e.g., W×H), the method only considers pixels within the rectangle (bw,bh) to (W-bw, H-bh). In one implementation, bw is set to 0.1*W and bh is set to 0.1*H. In one implementation, the current image frame is also downsampled. Downsampling the image allows the detection process to be completed more quickly, due to the reduced number of pixels that must be examined. The cropped and downsampled current image is placed into a buffer of recent image frames (209). The size of this buffer is determined by the needs of the cut and dissolve detection algorithms. In one implementation, the buffer of recent image frames is a circular buffer. As will be described in greater detail below, the cut pre-screening process pulls from this buffer to retrieve a previous frame for processing. The cut pre-screening process also pulls from this buffer to get the pre-cut frame and possibly some frames before, that are needed for the backward long-flash detector. The cut updating process pulls the pre-cut frame from this buffer. The dissolve pre-screening process pulls the center-of-dissolve and beginning-of-dissolve frames from this buffer. The dissolve pre-screening process also pulls other frames from this buffer (e.g., the within-dissolve frames) that are used to compare against a synthetically produced dissolve, as needed. Details of the cut and dissolve pre-screening processes are described in greater detail below.

Cut and dissolve detection begin in parallel. Cut detection includes cut pre-screening (210), where likely candidates for a cut declaration are found, and cut updating (310), where the status of potential cuts is updated according to the incoming frame information. Dissolve detection includes dissolve pre-screening (250), where likely candidates for a dissolve declaration are found, and dissolve updating (350), where the status of potential dissolves is updated according to the incoming frame information. Finally, cut, dissolve, and fade marking processes (400) are called to combine the information derived from the cut and dissolve pre-screening and updating processes and to mark a subset of the candidate cuts and dissolves, as appropriate.

a. Cut Pre-Screening (210)

Figure 2C:
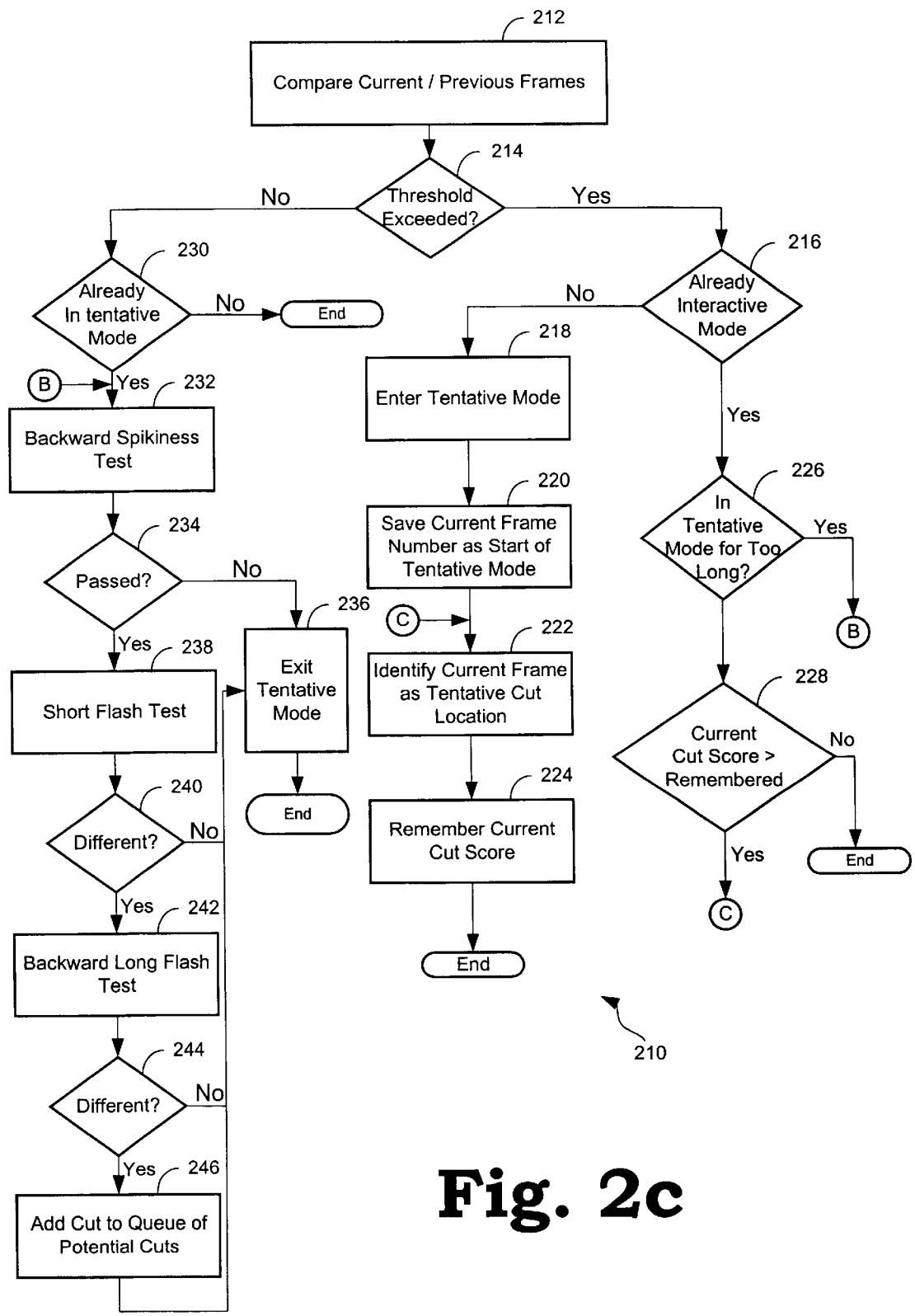
FIG. 2c is a flow diagram of a method for pre-screening cuts.

Referring now to FIG. 2c, the cut pre-screening process 210 begins by comparing the current and previous frames (212). Examples of the types of comparisons that are done may include motion differences and color differences, as described in more detail below. The results are compared against a corresponding set of thresholds. If all of the comparison results meet or exceed the corresponding set of preset thresholds (214), then there may be a cut between the current and previous frame. If the required subset (e.g., all) of thresholds are exceeded in step 214 and if the process is not already in tentative cut mode (216), then the process enters tentative mode with the current frame (218) and saves the current frame number as the starting frame for tentative mode (220). The process identifies the current frame as the tentative cut location (222) and sets the current cut score as the score associated with that tentative cut location (224). The cut score is a measure of how "cut-like" the transition between the current and previous frames appear. An example of a cut score is the product of the color and motion differences. Another example is their weighted mean. The process then exits the cut pre-screening portion of the process Upon exiting this portion, the module runs through cut updating, dissolve pre-screening (which can be done in parallel with cut pre-screening and/or cut updating), dissolve updating (which can be done in parallel with cut pre-screening and/or cut updating), and transition marking, all before receiving a new "current" frame. After each of these processes completes, a new frame can be retrieved for processing.

If the required subset of thresholds are exceeded in step 214 and if the system is already in tentative cut mode in step 216, the process checks to see if the process has been in tentative cut mode too long (226). If the process has been in tentative cut mode for too long, the process behaves as if the required subset of thresholds were not exceeded and continues at step 232. This prevents the process from remaining in tentative cut mode for too long of a period of time. In one implementation, the duration is limited to be less than the spikiness-test duration, $N_{spikiness}-1$, which is described below. This choice for the maximum tentative-cut-mode duration simplifies subsequent processing. If the process has not been in tentative cut mode for too long (226), the process checks to see if it should move the tentative cut location by comparing the current cut score with the score associated with a remembered cut location (228). If the current cut score is greater, the process continues at step 222 including changing the remembered tentative cut location and score to be the current frame number (222) and current cut score (224). Thereafter, the process exits the cut pre-screening process until there is a new frame to be processed.

If one or more of the required subset of thresholds is not exceeded in step 214 and if the process is not in tentative cut mode already in step 230, then the process exits the cut pre-screening process until there is a new frame to be processed. If one or more of the required subset of thresholds is not exceeded (214) and if the process was in tentative cut mode from the previous frame as determined in step 230 (or if the module has been in tentative cut mode for too long as determined in step 226, then the process exits tentative cut mode (236) and completes an additional battery of tests to try to determine if the tentative cut associated with the just-exited tentative cut mode is truly a cut. The first test compares the tentative cut score with the cut scores of the previous $N_{spikiness}$ frames (232), where $N_{spikiness}$ is defined to be the spikiness-test duration. This comparison is referred to as the backward spikiness test. In one implementation, $N_{spikiness}$ value is set to 15 frames. In one implementation, the backward spikiness test assigns the tentative cut a backward spikiness value equal to the tentative cut score divided by the average cut score over the tentative cut location and the $N_{spikiness}-1$ frames preceding it. In one implementation, the backward spikiness test requires a tentative cut frame's backward spikiness value to meet or exceed a pre-set threshold. If the tentative cut fails the backward spikiness test (234), the process exits the cut pre-screening process, without recording the tentative cut in a queue of potential cuts. The omission from the queue effectively discards the tentative cut.

If the tentative cut passes the backward spikiness test (234), then the short-flash detector test is applied (235). The short-flash test compares the current frame to the frame just before the frame that first caused the process to enter the tentative cut mode, which will be referred to as the pre-break frame. The short-flash test ensures that the post-cut footage looks sufficiently different from the pre-cut footage. If the two frames are not sufficiently different (240), then the tentative cut is dropped from consideration (the cut is declared a short flash), the process exits the cut pre-screening process.

If the two frames are sufficiently different (240), then a backward long-flash detector test is applied (242). In one implementation, the backward long-flash detector test is applied only if the pre-cut frame was more recent than a long-flash duration maximum threshold, in order to save computation. The backward long-flash detector test compares the current frame against the frames before the pre-cut frame up to the long-flash-duration-maximum ($N_{flash}$) frames ago (e.g. 10). In an alternative implementation, the backward long flash detector compares a fixed number of pre-cut frames (e.g., 3) against the current frame. In either case, the long flash detector is applied to determine whether the potential cut may be associated with a long flash event. A long flash event can arise when, for example, a person walks in front of the video camera, producing two short, disjoint periods of large change: one when the event starts (e.g., the person blocks the scene from the camera's view), and a second when the event ends (e.g., the person moves away and the scene is again visible). If the current frame and any of the tested previous frames are too similar (e.g., not different) (244), then a long flash is declared and the potential cut discarded. The process then exits the cut pre-screening module. If no backward long flash is detected in step 244, the tentative cut is placed in a queue of potential cuts that will be used as an input to the cut update process. The process then exits the cut pre-screening process until another frame is available for processing.

b. Dissolve Pre-Screening

The dissolve screening process determines if a dissolve can be marked in the video footage. In doing this, the process uses a nominal dissolve length, $N_{dissolve}$ (e.g., 20 frames). The process seeks to find the center of a dissolve by testing the hypothesized center frame against frames located $N_{dissolve}/2$ frames before and $N_{dissolve}/2$ frames after the hypothesized center frame. If a potential dissolve is identified, the process compares both nominal ends of the dissolve against one another, to ensure that they are sufficiently different. In addition, the process checks the observed footage against a hypothetical synthetic dissolve produced by the process. The synthetically produced dissolve can be produced by performing a cross fade on the (nominal) starting and ending frames of the hypothesized dissolve. The synthetically produced dissolve can include synthetic motion within the synthetic dissolve (transition), where the type and amount of motion is determined by estimates based on motion/zoom estimation on the footage on either side of the extended transition. If the synthetic and identified dissolves are sufficiently similar, then a dissolve can be declared and stored by the process. Whether the dissolve is ultimately marked is determined in the cut, dissolve, and fade marking process described below in association with FIG. 3.

Referring to FIG. 2d, the dissolve pre-screening process 234 is described in greater detail. The process begins by checking to determine if the module has seen (processed) a sufficient number of frames (e.g., at least $N_{dissolve}/2$ frames of footage) (252). If not, the process ends. As described above, the module can transition to (1) to the dissolve updating process or (2) (if the cut pre-screening process has not already been done for the current frame) to the cut pre-screening process or (3) (if the cut pre-screening has been done for the current frame but the cut updating process has not been done for the current frame), to the cut updating process. The module will not initiate the marking process until after the system has complete all of the above.

If a sufficient number of frames have been seen, the process compares the current frame with the frame $N_{dissolve}/2$ earlier (254) and buffers the results (256). In one implementation, this comparison is done using the same set of motion-difference, color-difference, and score analyses as were used in cut detection (just applied to frames with a different separation interval). The process then checks to determine if a sufficient number of frames have been seen (i.e., at least $N_{dissolve}$ frames of footage) (258). If not, the process ends as described above. If a sufficient number of frames have been seen, the process checks the just-buffered analysis results to see if the current frame, which is acting as the nominal end of a hypothesized dissolve, is different enough from the frame $N_{dissolve}/2$ earlier, which is acting as the center of a hypothesized dissolve (260). If the two frames are not different enough, the process ends. Otherwise, the process checks the buffered analyses from $N_{dissolve}/2$ frames earlier to see if the hypothesized dissolve center is different enough (e.g., the motion-difference, color-difference, and score are greater than the predetermined thresholds) from the frame $N_{dissolve}/2$ earlier, which is acting as the nominal start of a hypothesized dissolve (262). If not, the process ends.

If the process verifies both half-dissolve tests (step 260 and 262), then a full dissolve test is performed including comparing the current frame (the nominal dissolve end frame) with the frame $N_{dissolve}$ previous from the current frame (the nominal dissolve start frame) (264). If the end of the potential dissolve is sufficiently different from its start (e.g., the comparison results and score are greater than the predetermined threshold) (266), then the potential dissolve is compared to a synthetic dissolve (268). In one implementation, the comparison of the synthetic dissolve to the potential dissolve is only performed on a subset of the frames. In one implementation, only the center three frames of the hypothesized and synthetic dissolves are compared. For each frame, the system computes the difference between the test frame and a frame that would have been created if a dissolve of length N were present between the starting and current (ending) frames. In one implementation, the system accumulates the color and motion difference values along with a score value for each frame, then averages the comparisons and compares them to corresponding thresholds. If any of the values exceed preset thresholds (270), then the process ends. The thresholds for each test are set to the minimum of pre-set thresholds and the values computed for the full-fade comparison. If all the values are less than the thresholds (so that the observed frames and the synthetic-dissolve frames are similar) in step 270, the process computes a "dissolve spikiness" (272). In one implementation, the "dissolve spikiness" is the full-dissolve-comparison score divided by the average synthetic-to-observed score. If the dissolve spikiness is greater than a threshold (274), the process accepts the dissolve, else the process ends.

The remaining tests in the dissolve pre-screening process determine whether the process should add a completely new dissolve to the queue, to represent a newly accepted dissolve or whether the process should instead extend a previously queued dissolve to cover the newly accepted dissolve. First, the process checks to see if the newly accepted dissolve overlaps sufficiently with a previously queued dissolve (276). In one implementation, the overlap must be at least $N_{dissolve}/2$ frames. If sufficient overlap is detected, the system also checks to see if the previous dissolve is short enough to allow further extension (280). In one implementation, this limit is set to 300 frames (10 seconds), which is longer than the module would expect any true dissolve to extend. If there is a previously queued dissolve that overlaps sufficiently and that is not too long, then the newly accepted dissolve is merged into that previously queued dissolve by extending the previously queued dissolve to fully cover the newly accepted dissolve (282). Otherwise, the newly accepted dissolve is added as a new entry in the dissolve queue, with its extent set to be from $N_{dissolve}/2$ frames before the center frame to $N_{dissolve}/2$ frames after (278). Thereafter, the dissolve pre-screening process ends.

c. Cut Updating

Figure 3A:
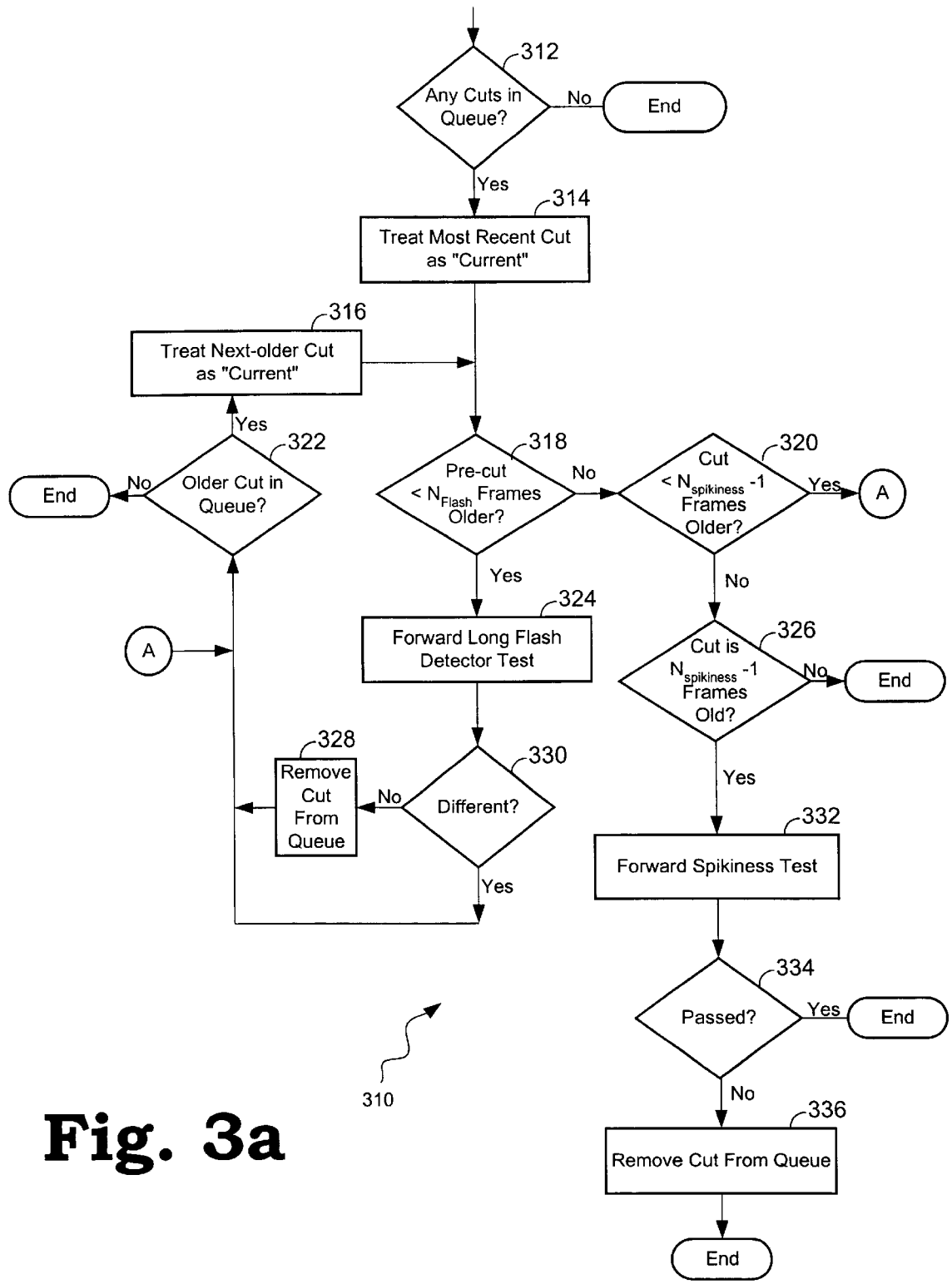
FIG. 3a is a flow diagram of a method for updating the cut queue.

The system is required to update the status of the cuts that are no longer in "tentative mode" but have not yet been fully tested. As described above the potential cuts are placed in a queue of potential cuts that require more testing before they are declared "true" cuts: each potential cut still needs to be tested for spikiness relative to the average over the upcoming $N_{spikiness}-1$ frames and each still needs to pass the forward-looking version of the long-flash detector. The process for updating cuts in the potential cut queue is shown in FIG. 3a. A check is made to determine if there are any cuts in the queue (312). If not, the process ends. Again, part of the ordering is arbitrary. If dissolve pre-screening or dissolve updating have not been completed for the current frame, the module transitions to complete these processes. If the dissolve pre-screening and updating have been completed, the module transitions to the marking process.

Otherwise, the process identifies the most recent cut in the potential cut queue for processing (314). If the pre-break frame associated with the current cut is less than $N_{flash}$ frames old (318), the system invokes the forward long-flash detector (324), to check to see if the proposed cut was actually just the leading edge of a long flash. The process does this by comparing the pre-cut frame against the current frame. If these two frames are not different enough (330), the cut is associated with a long flash and is removed from the queue (328). In either case, the system checks to see if there are older potential cuts in the queue (322) and, if there are, the process repeats these tests, starting with step 318, on the next-older cut in the queue (316). If there are not any other cuts in the queue, the process ends.

If the pre-cut frame associated with the cut currently being processed is older than $N_{flash}$ in step 318, the system checks to see if the cut location is less than $N_{spikiness}-1$ frames old. If the cut location is not old enough, processing continues with the next older cut from the queue, if there is one at step 322. Otherwise, if the current cut is not exactly $N_{spikiness}-1$ frames old (326), the process ends. If the current cut is exactly $N_{spikiness}-1$ frames old, a forward spikiness test is invoked to check to determine if the frames score is large enough compared to the average scores of the $N_{spikiness}-1$ frames following it (332). If the frame does pass the forward spikiness test at step 332, the frame is accepted and the process ends. If the cut does not pass the forward spikiness test, the cut is discarded (336) and the cut updating process ends.

d. Dissolve Updating

Figure 5:
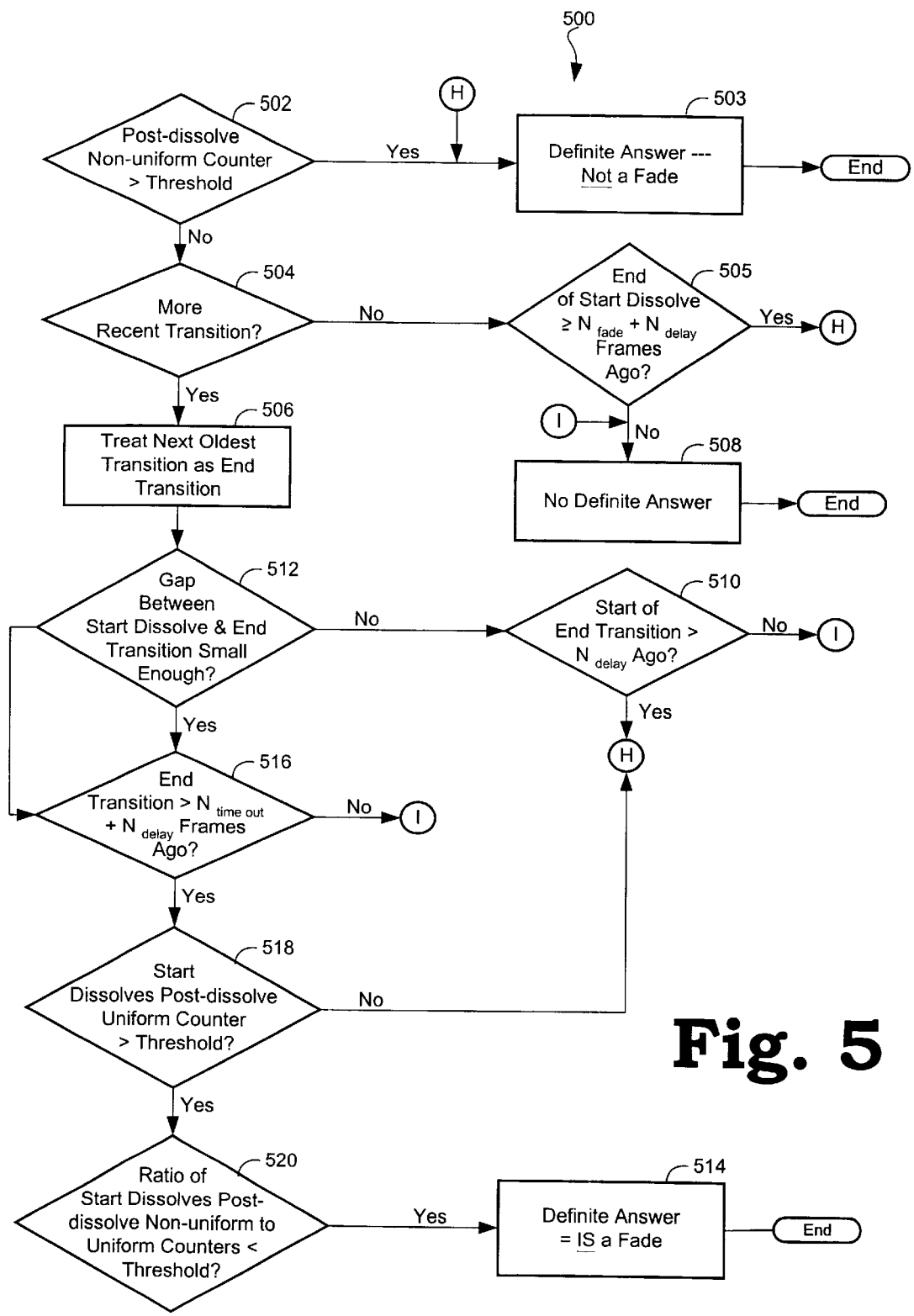
FIG. 5 is a flow diagram of a method for recognizing fades.

In one implementation, the approach to fade detection that is described below (and is shown in FIG. 5) requires the module to update frame counters associated with each dissolve that is queued but not yet been declared. If some other approach to fade detection is taken that does not require these counters, then the dissolve updating module can be omitted completely.

The process for updating dissolves 350 is shown in FIG. 3b and begins by checking to see if there are any potential dissolves that are older than $N_{delay}$ frames (352). The value for $N_{delay}$ is set to the maximum of $N_{dissolve}/2$ frames, which is the maximum delay in determining if a potential dissolve is valid, and $N_{spikiness}-1$ frames, which is the maximum delay in determining if a potential cut is valid. If there are no dissolves that are at least this old, the process ends. Again, part of the ordering is arbitrary. If cut pre-screening or cut updating have not been completed for the current frame, the module transitions to complete these processes. If both of the cut processes have been completed, the module initiates the marking process.

Otherwise, the process retrieves the frame $N_{delay}$ frames before the current frame (353) and determines if the frame was a uniform or a non-uniform frame (354). The result of this determination is used later in the dissolve updating module. The process then checks to see if any of the queued dissolves include the $N_{delay}$-ago frame in their extent (356). If there is only one dissolve that does (360), the system selects that one dissolve and the process continues at step 368. If there is more than one dissolve that includes the $N_{delay}$-ago frame in its extent, the system picks the dissolve that is centered closest to the $N_{delay}$-ago frame (364). Thereafter, the process increments one of the selected dissolve's dissolve-internal frame counters: if the $N_{delay}$-ago frame was uniform, the process increments the dissolve-internal uniform-frame counter (374); if the $N_{delay}$-ago frame was uniform, the process increments the dissolve-internal nonuniform-frame counter (376). There after the process ends.

If there is no dissolve that includes the $N_{delay}$-ago frame in its extent as determined in step 356, the process picks the most recent dissolve that is older than $N_{delay}$ frames (358). The process then checks to see if there was a valid cut detected between that dissolve and the $N_{delay}$-ago frame (362). If a valid cut was detected, the process ends. If not, the process increments one of the selected dissolve's post-dissolve frame counters: if the $N_{delay}$-ago frame was uniform, the process increments the post-dissolve uniform-frame counter (370); if the $N_{delay}$-ago frame was uniform, the process increments the post-dissolve nonuniform-frame counter (372). Thereafter, the dissolve updating process ends.

e. Cut/Dissolve/Fade Marking

After the cuts and dissolves are updated, the scene detection/annotation module marks a subset of the queued, accepted cuts and dissolves, as appropriate. Which cuts and dissolves are marked depend on various rules, such as a rule that respects a minimum scene duration. The marking process is also affected by fades that are recognized. The process for marking cuts, dissolves, and fades is described in association with FIG. 4.

Figure 4:
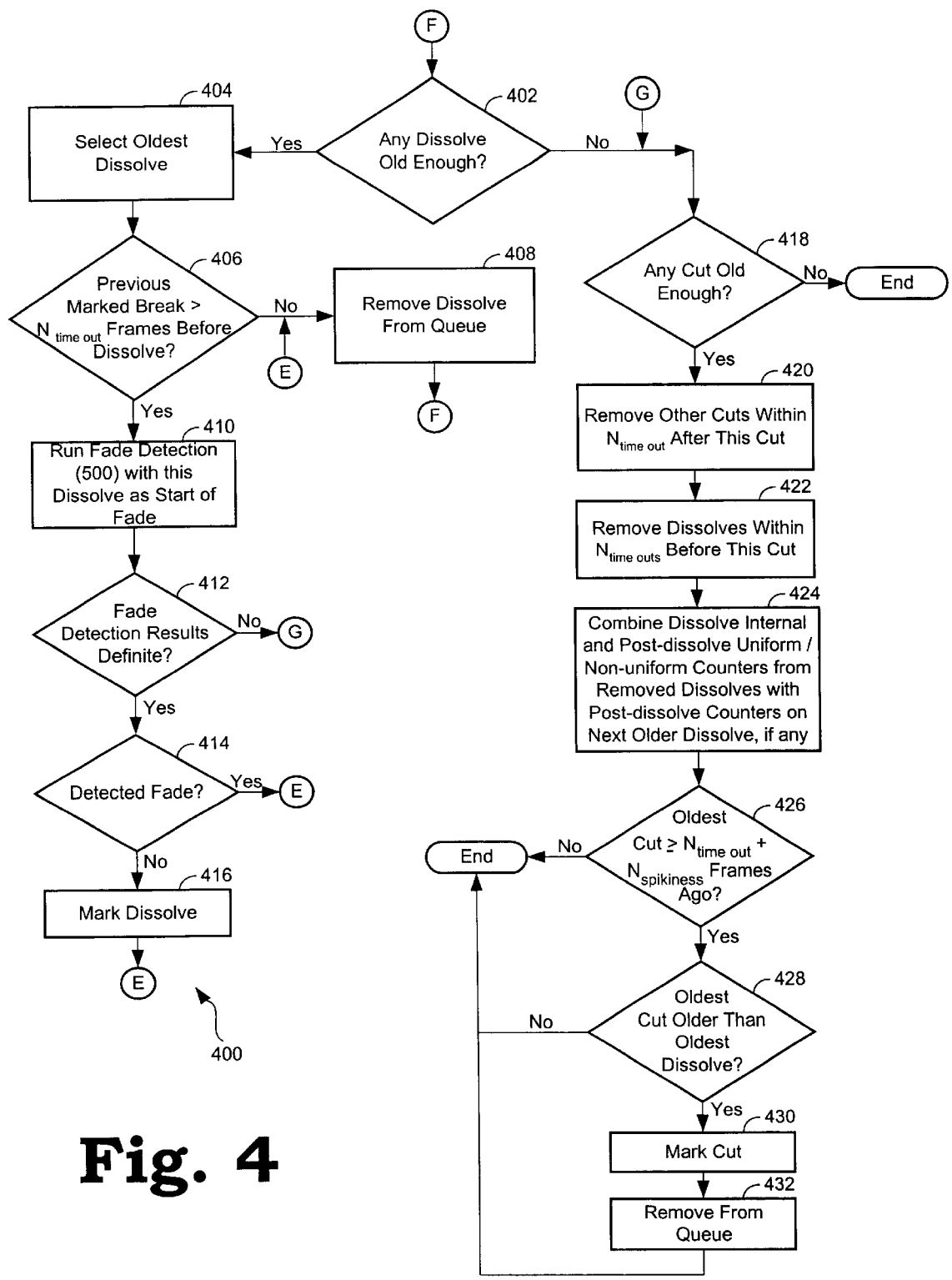
FIG. 4 is a flow diagram of a method for marking cuts, dissolves and fades.

Once the module has updated the cuts and dissolves, the module invokes the marking portion of the process 400 as shown in FIG. 4. First the process checks to see if there are any dissolves that are old enough that they can be marked or discarded. Dissolves are checked first since the delay in deciding to mark them tends to be longer than that for cuts. More specifically, the process checks to determine if there is a dissolve in the dissolve queue that ended a predefined number of frames ago (402). In one implementation, the predefined number of frames is set to at least $N_{timeout}+N_{spikiness}$ frames ago. Generally, the system needs to wait $N_{timeout}+N_{spikiness}$ frames before marking dissolves, since a dissolve can be timed out by a cut that follows it within the next $N_{timeout}$ frames and since the system does not know whether or not a cut has passed all of the necessary tests until it completes the forward spikiness test at $N_{spikiness}-1$ frames. If the system identifies one or more dissolves that are old enough to be marked, the system selects the oldest such dissolve (404) and performs several checks before actually deciding to mark it.

First, the system checks to see if the previous break ended more than a time out period ($N_{timeout}$ frames) before the start of the selected dissolve (406). The process can have dissolves in the dissolve queue that are too close to the previous break since the system sometimes keeps timed-out dissolves around in order to be sure that they are correctly merged with newly detected dissolves in module 282, before the expanded dissolve is removed. If the previous break was too recent, the process drops the dissolve from the dissolve queue without marking it (408) and repeats the process starting from step 402.

After checking the time out in step 406, the system checks to see if the current dissolve might be the first transition in a fade. In one implementation, fade detection is accomplished according to the method shown in FIG. 5. In any implementation, the result from the fade detection is expected to produce one of three values: (1) a first value indicating that the current dissolve is definitely the start of a fade and there is another break in the cut or dissolve queues which should be used to mark this fade; (2) a second value indicating that the current dissolve is definitely not the start of a fade; or (3) a third value indicating that no definite answer can be given at this stage in the processing. If the result from fade detection is indefinite (412), then the process postpones its decision on whether or not to mark this oldest dissolve and, instead, proceeds to step 418 to process the accepted cuts listed in the cut queue. If the result of fade detection determines that the dissolve is definitely not the start of a fade (414), then the dissolve is marked (416). Otherwise, the dissolve is not marked and the process continues at step 408. In either case where a definite answer was given from fade detection (steps 414 and 416), the dissolve is removed from the dissolve queue (408) and the process continues at step 402.

Using the approach described above, the process will sometimes postpone marking a dissolve (due to uncertainty in the fade-detection results) and will later find out that the system should have marked the dissolve. If the dissolve is still within the last $N_{max.delay}$ frames, there is no problem with this: the module can go ahead and mark the dissolve at its "best" location. Otherwise, the module simply places a mark at a frame located at $N_{max.delay}$ frames ago, as an approximation to marking the dissolve in its correct position. This type of solution is proposed in view of a constraint based on the maximum latency of the system. Where a lesser constraint is imposed or no constraint, the module can mark the dissolve at the exact frame location.

Continuing with the process, once all of the oldest dissolves have been marked as appropriate, the process considers the oldest cut at step 418. A check is made to determine if the oldest cut is sufficiently old (418). In one implementation, a check is made to determine if the oldest cut is at least $N_{spikiness}-1$ frames old. If the oldest cut is at least that old, then the process removes other cuts that follow within $N_{timeout}$ frames after the oldest cut (420) and the process removes dissolves that end within $N_{timeout}$ frames before the oldest cut (422). The process does not remove dissolves that extend after the oldest cut, since the process may need these dissolves in the queue to correctly merge the already-timed-out portions of a long dissolve, with later portions of a long dissolve, and thus time-out the full dissolve, even if parts of it are more than $N_{timeout}$ frames after the cut.

If any dissolves from before the cut are removed from the dissolve queue, due to the time-out (422) and if there are any older dissolves still in the dissolve queue, counters of the most recent dissolve that is older than the removed dissolves are updated (e.g., the frames counted by the removed dissolve's dissolve-internal and post-dissolve uniform counters are added to the still-queued dissolve's post-dissolve uniform counter and the frames counted by the removed dissolve's dissolve-internal and post-dissolve non-uniform counters are added to the still-queued dissolve's post-dissolve non-uniform counter) (424).Thereafter, if the oldest queued cut is not at least $N_{timeout}+N_{spikiness}-1$ frames old (426), the process ends. If the oldest queued cut is at least $N_{timeout}+N_{spikiness}-1$ frames old and if the oldest cut is older than the oldest queued dissolve (428), the process marks the oldest queued cut (430) and removes it from the queue (432). Otherwise and thereafter, the process ends. The system waits a full $N_{timeout}+N_{spikiness}-1$ frames before marking an accepted cut, so that any tentative cuts that are taking $N_{spikiness}-1$ frames to leave tentative mode and move over to the cut queue are correctly timed out.

ii. Scene Detection Support

There are many possible implementations for the lower-level functions that are used in scene detection. This section describes at least one implementation for each of: fade recognition, color-difference computation, and motion-difference computation.

a. Recognizing Fades

As previously described, the dissolve-marking process depends on the results of a fade recognition test. If a dissolve is determined to be the start of a fade and if the end of the fade can instead be marked without violating system constraints (e.g., a minimum-scene duration requirement and cut/dissolve/fade-marking prioritization), then the fade-initial dissolve will not be marked. To support the above described behavior, the module must include a fade detector that will indicate whether a given dissolve should definitely be marked (i.e., it is not the start of a fade or, if it is, the end of the fade is timed out), or whether a given dissolve should definitely not be marked (i.e., it is the start of a fade and the end of the fade is definitely not timed out), or whether no definite answer can be given yet. One implementation of such a fade detector is described below.

In one implementation, a fade is considered to be a dissolve followed within a pre-set number ($N_{fade}$) of frames by another dissolve or a dissolve followed by a cut, with a largely uniform intervening period. Typically a fade is two dissolve-like transitions separated by a "short" largely uniform period. However, one or both of these dissolve-transitions can be mis-marked as cuts in place of one or both of these dissolves. An example of this is when a flash occurs during one of the dissolves. In one implementation, the module does not recognize a cut followed by a dissolve or a cut followed by a cut as a fade. Transitions such as these can result in mistakes on "pre-scene titles," which cut at the end of the previous topic to a title slide and then fade or cut to the next video sequence.

The fade recognition process runs when called during the dissolve marking process described above. The process is given an as-yet unmarked dissolve as a hypothesized start to the fade. The fade recognition process seeks to find and evaluate a next transition after the given dissolve and determine if a fade is present. Referring now to FIG. 5, the fade recognition process 500 begins by comparing the post-dissolve non-uniform counter of the given start dissolve against a threshold (502). If the counter is greater than the threshold, the given start dissolve is definitely not the start of a fade. The dissolve is marked as "definitely not the start of a fade" (503) and the process ends. Otherwise, a check is made to determine if there are more recent transitions (504). If not, the process checks to see if the end of the start dissolve (e.g., the dissolve that would mark the start of the proposed fade) is more than $N_{fade}+N_{delay}$ frames ago (505). If the end is more than $N_{fade}+N_{delay}$ frames ago as determined in step 505, the given start dissolve is definitely not the start of a fade (since no fade-end transition can be introduced within $N_{delay}$ frames after the given dissolve). This fact is noted (503) and the process ends. If the end of the start dissolve is less than $N_{fade}+N_{delay}$ frames ago (505), the process exits without a definitive answer (508).

If step 504 did find one or more transitions after the given start dissolve, the process treats the oldest of these transitions as the hypothesized end-fade transition (506). Thereafter the process checks how many frames are between the given start dissolve and the selected end-fade transition. If that gap is more than $N_{fade}$ frames (512) and if the end-fade transition is more than $N_{delay}$ frames old, then the given start dissolve is definitely not the start of a fade. This fact is noted (503) and the process exits. If the gap is more than $N_{fade}$ frames in step 512 but the end-fade transition is less than $N_{delay}$ frames old, then the process exits without a definitive answer (508).

If that gap is between the given start dissolve and the selected end-fade transition is less than $N_{fade}$ frames in step 512, the process checks to see if the end-fade transition is more than $N_{timeout}+N_{delay}$ frames old (516). If the transition is not old enough, the process exits without a definitive answer (508). If the transition is at least that old, step 518 checks to make sure that there are at least a minimum number of uniform frames between the start dissolve and the end-fade transition (e.g., 1). If there are not, the given start dissolve is definitely not the start of a fade. This fact is noted (503) and the process exits.

If the required minimum number of uniform frames are detected, the process then compares the ratio of non-uniform to uniform frames that are between the start dissolve and the end-fade transition (520). If the ratio is greater than a predefined threshold, the given start dissolve is definitely not the start of a fade. This fact is noted (503) and the process exits. Otherwise, if this ratio is less than that threshold as determined in step 520, the given start dissolve definitely is the start of a fade. This fact is noted (514) and the process exits.

b. Computing Color Differences

There are many standard ways of computing color differences. In one implementation, the module first computes a 2D color histogram of the image frame. The two color axes are used to compute a representative color model of the image frame. The two axes are normalized red (r'=r/r+g+b) and normalized green (g'=g/r+g+b). Thereafter, the module creates a 2D array, H, where each bin, H(r',g'), represents a rectangular region in normalized red and green space. Each bin is initially set to zero. For each pixel in the image, the pixel's normalized color values (r',g') are computed and the count in H(r',g') is incremented by one.

The actual color difference is computed by comparing the histogram for the current image frame and the previous image frame(or identified image frame). The color difference between the two image frames is the histogram intersection: the module accumulates, for each bin location in each histogram, the count of the smaller of the two bins [CD =sum(min(H1(i,j),H2(i,j)))/N where I and j are indexed over all the bins in the histogram and where N is the total number of pixels in the image frame].

c. Computing Motion Differences

There are many standard ways of computing motion difference. In one implementation, the module computes a motion difference by calculating the total number of pixels that have changed significantly between the two images. The module uses the intensity value of each pixel I(x,y) to do the comparison. Let m(x,y)=1 if |I1(x,y)_I2(x,y)|>threshold, 0 otherwise. Then the motion difference MD=sum(m(x,y)).

iii. Scene Annotation

Referring again to FIG. 1, scene detection/annotation module 64 includes various annotations of each of the detected scenes. In one implementation, scene annotation includes bad video segment information as well as a representative still image for the scene. In one implementation, the scene detection/annotation module 64 provides as an output a JPEG still for each scene.

a. Extracting Representative Frames

In one implementation, the process for selecting a representative still for a scene includes picking the first frame of the scene. Although this strategy works very well for professionally produced footage, the strategy does not work well for home camcorder footage. The first few frames of home footage often contain garbage because the person has not quite set up the shot yet. In one implementation, a better choice for the representative frame is selected by analyzing the entire segment and selecting an image that best approximates the rest of the segment. In one implementation, the module restricts this representative image to be within the first few seconds of the scene (the "segment intro").

To select a better representative frame, the module computes a color model of the entire scene by computing the average color histogram of the entire scene. This average histogram is compared with every image in the segment intro using histogram intersection (see previous discussion). The image frame with the smallest color difference is chosen.

In one implementation, a one-pass algorithm is used to extract the representative frames while the scene break detection is going on. As soon as a new scene is detected, all the successive images in the segment intro (usually 5 seconds=150 frames) are stored in a buffer. In addition, the module keeps track of the running sum of all the bins in the histogram. When the end of the segment is detected, the module computes the average histogram by dividing each bin by the total number of images. This average histogram is compared against the frames in the buffer. The best match is selected and output as the representative frame. In one implementation, a slight trick is used due to the timeout period. More specifically, the module does not know that a scene has been detected until a timeout (e.g., ⅓ of a second) after the break was initially processed. The module maintains a second additional buffer sized in accordance with the timeout period (e.g., ⅓ second=10 frames for a 30 fps video segment) to make sure the module does not miss any frames.

b. Bad Video Segment Detection

Home camcorder footage often includes segments in which there is not a valid video signal on the tape. This can occur if the lens cap is left on while recording, if the tape is accidentally fast-forwarded during filming (leaving an unrecorded portion of the tape) or by other means. The most common cause of this problem occurs when a tape is removed before it has been filled to 100% of capacity producing a tape that includes a final segment with no video signal.

In one implementation, in order to automatically detect and remove such bad video segments, the module performs analysis on the representative still selected for each segment and removes those segments that do not have a valid video signal. This of course assumes that if the representative still has a valid signal, then the remainder of the detected segment will also have a valid signal. Since the representative frame is by definition the frame that best represents the entire segment, then this assumption is often good in practice.

In one implementation, to determine whether or not the representative still has a valid video signal, the module computes statistics on each of the color channels (e.g., three in an RGB device) and compare then to preset thresholds. In one implementation, the module computes the standard deviation of the red, green and blue color components [for example for the red component: StdDevR=sum((Rk−avgR) *(Rk−AvgR))/N, where AvgR Is the average value of the red component throughout the image, N is the total number of pixels in the image and Rk is the value of the red component of the kth pixel in the image, where k ranges from 0 to N−1.] The module then checks to see if the standard deviation computed is less than a threshold [e.g. StdDevR<ThresholdR.] If so, then the still image is labeled a bad image and the associated segment is labeled a bad segment (e.g., scene). In one implementation, the threshold values are determined by performing a regression analysis on a database of home camcorder footage.

An alternate implementation of the frame classification uses the uniformity of the frame in place of the standard deviation thresholds.

In an alternative approach, a check can be made of each image (still) in a segment. When the color statistics for most frames of the scene match the model of a bad-segment frame, a bad segment is declared. This approach can include tests on the variance of the frame-average color over the segment, to insure that the color is not changing significantly. The bounds on this test can be very tight, since most VCRs produce a single, stable color frame to indicate an invalid frame: nearly all of the variance in the color is between different VCRs (e.g., VCR1 may produce a purplish garbage frame while VCR2 produces a bright blue garbage frame). This test allows much higher confidence in the classification results.

C. Processing the Digitized Video Including Scene Breaks

Referring again to FIG. 1, after the scene detection process has been performed, the digitized video (e.g., MPEG file) and scene detection information (e.g. scene identifiers and JPEG stills) are provided to streaming video processor (s) 66 and splitter 68. Streaming video processor 66 operates on the digitized video to produce a streaming version (encoded version) that can be easily downloaded or viewed over a network (e.g., the Internet). In one implementation, two parallel streaming processors 66a and 66b are provided that produce streaming video output streams at two resolutions and bit rates. Streaming video processor 66a provides a streaming video output for supporting a 56 k modem configuration while streaming video processor 66b provides a streaming video output for supporting a digital subscriber line (DSL) configuration. In one implementation, video output processor 66 outputs a RealVideo format file and any accompanying SMIL files necessary for previewing the RealVideo format file by the user.

The output of video processor 66 is provided as an input to splitter 68. Splitter 68 takes the scene detection information and produces individual encoded files, one for each scene. The output of the splitter 68 is provided as an input to server system 70. In one implementation, two parallel splitters 68a and 68b are provided that produce encoded output files at two resolutions and bit rates. Splitter 68a provides as an output scene-based encoded files to support a 56 k modem configuration while splitter 68b provides as an output scene-based encoded files to support a DSL configuration. In one implementation, splitter 68 outputs RealVideo format file(s) and any accompanying SMIL files necessary for previewing the RealVideo format file by the user.

Server System

Server system 70 includes a batch processor 72, a database 74, a client server 76 and streaming video server 78.

Batch processor 72 receives as an input encoded (e.g., scene-detected RealVideo files) and digitized video files (e.g., the digitized MPEG file) from local video processing system 60. The connection between server system 70 and local video processing system 60 can be optimized to support needed bandwidth and cost structure. In one implementation, the connection between the devices is a high speed T1 link. In another implementation, this connection is a physical device such as a removable hard disc or an Iomega, Inc. Jazz disc. Batch processor 72 writes all of the information associated with the files to the database 74 and copies all files into an appropriate directory structure. In one implementation, all files associated with a digitized video are stored in a single directory associated with the user's ID. Other directory structures can be used.

Client server 76 receives notice from batch processor 72 when the data transfer to the database 72 has been completed and the video content is available for processing. Client server 76 includes plural applications for interfacing with the user and the various other system components. In one implementation, client server 76 includes an E-mail application that can be invoked to send notification to the user that the digitized video is available for review.

Client server 76 hosts a website that can be visited by the user. Client server 76 is connected to one or more client computers 80 by a network 82 such as the Internet. Client server 76 includes a web front end (not shown) that manages the communications with the client computers 80. The website can include plural applications that when executed allow the user to view, edit, manipulate, archive and order copies of the digitized content. The website architecture and user interface are described in greater detail below.

In one implementation, the user can view a streaming video version of the digitized content stored in the database 74 in server system 70. Streaming video server 78 can download to the user via the network 82 a streaming version of a scene, storyboard or album. The streaming video version-can be a low-resolution version of the original digitized content stored in the database 74.

In one implementation, the video material is stored for predefined length of time at server system 70. In one implementation, server system 70 sends E-mails at 10 and 14 days that warn of imminent deletion of material. Ultimately, material can be deleted after a predefined period (e.g., 21 days). Any in-process albums will be altered to remove the deleted material. An E-mail can be sent after deletion that informs the user how to send in an archive CD for reposting of material.

Client Computer

The client computers 80 can be connected to various input devices (digital video camera, digital still camera and storage means) so that a user can upload captured digital images, video clips or previously digitized video scenes to the client computer 80. Alternatively, or in addition, the client computer 80 can execute digital video processing software such as Ulead Video Studio 3.0 SE or image processing software such as ADOBE PHOTOSHOP® in order to create and/or edit digital video or still images. The client computer 80 includes a storage medium (not shown) such as a hard disk for storing the digital video or still images.

The client computer 80 is connected to the network 82, for example, using a modem or network interface card. The system can be implemented as a browser-based system in accordance with the standard protocols for communicating over the Word Wide Web. In such an implementation, a user of the client computer 80 can execute a browser 84 to connect to and interact with the client server 76. As described above, client server 76 includes a web front end that manages the communications with the client computer 80. The user of the client computer 80 can upload digital content to the client server 76. The web front end receives the uploaded digital content and stores the content in database 74.

Production System

The user of the client computer 80 can also order content made from edited or raw content as will be described in greater detail below. The client server 76 includes or is connected to a production system 90. Production system 90 receives the selected digitized content from the client server 76 and generates a physical manifestation (e.g. DVD or CD) of the content from the selected digitized content. Alternatively, the production system receives an edit list that identifies the content to be processed and the content is retrieved from the database 74 (e.g., from the database server). The items generated by the production system 90 can be shipped to the user using a conventional shipping service such as the United States Postal Service or Federal Express.

In one implementation, the production system includes a user interface that is presented to the user to allow for a one-click publication process. The automatic publication process includes the generation of scenes, high resolution content, streaming content, contact sheets and other materials for inclusion in a finished product. The publication services are described in greater detail in co-pending United State Patent Application entitled "Video Processing System", filed Jun. 16, 2000, and assigned Ser. No. 09/595, 615, the contents of which are expressly incorporated herein by reference.

Process for Ordering Video Products

Figure 6:
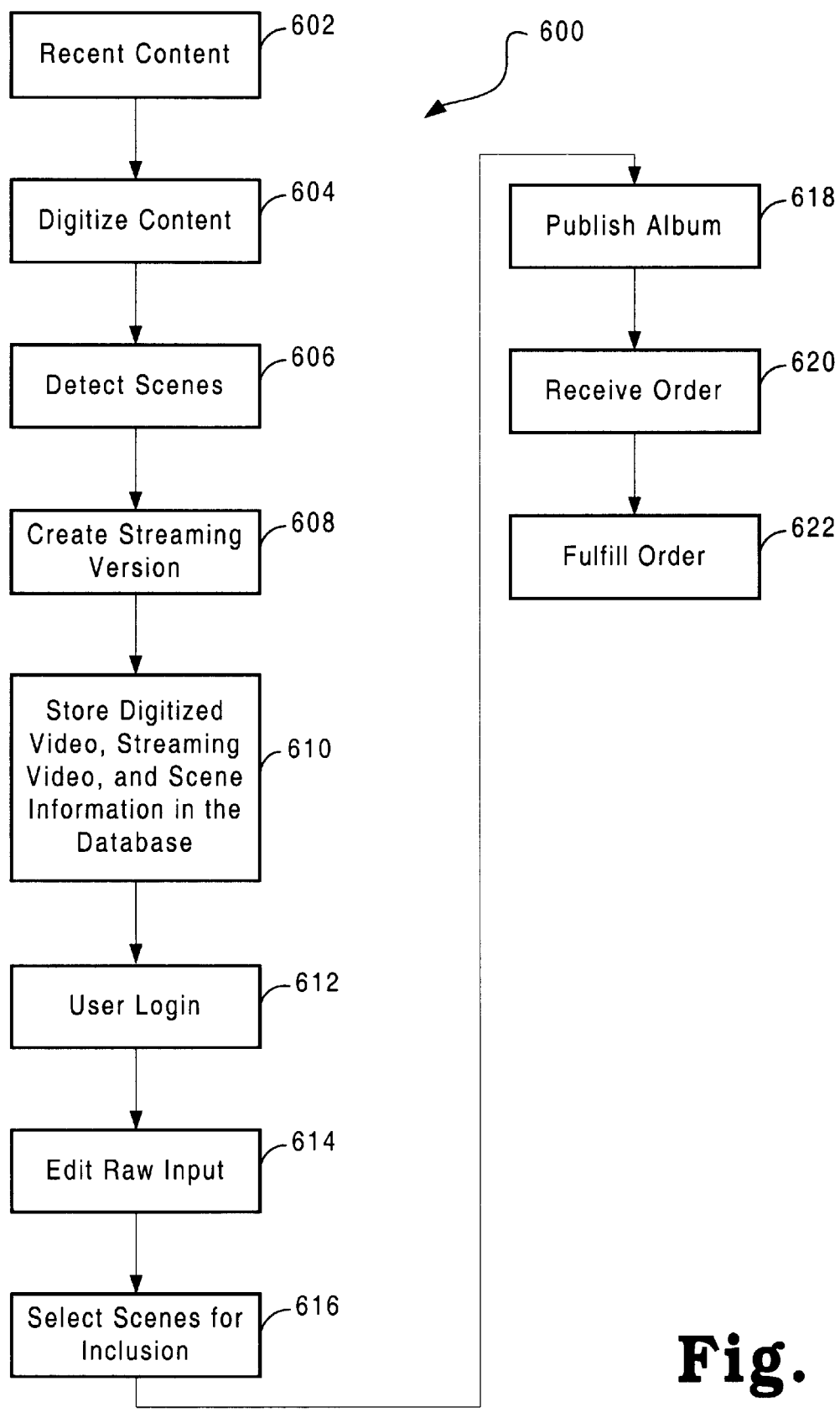
FIG. 6 is a flow diagram of a high-level process for offering digitized video products for sale over a computer network such as the Internet.

FIG. 6 is a flow diagram of a high-level process 600 of offering digitized video products for sale over a computer network such as the Internet. First, content is received (block 602). For example, a user can send an 8 mm tape for processing to the local video processing system 60. The content is digitized (604) and a scene detection process is invoked (606). In one implementation, a user executing a browser on the client computer 80 can access the web front end of the client server 76 and upload a digitized video or other digital content directly to the client server 76 bypassing the local video processing system 60. In this implementation, the client server either invokes a local scene detection process or forwards the digitized video that is received to the local video processing system 60 for scene detection services. Alternatively, the user can upload or otherwise send material that has been previously digitized by the local video processing system (e.g., a published CD). The material is reposted to the web site after which it is handled as if it had just been digitized by the local video processing system 60.

Then, the local video processing system 60 operates on the digitized video to produce one or more encoded streaming versions of the digitized video (608). The digitized video, scene detection information and encoded streaming versions of the digitized video are then stored in database 74 accessible by client server 76 (610).

The web front end of the client server 76 can be configured to allow the user to view scenes stored in the database 74 and select one or more scenes for subsequent processing or inclusion in an album as described below. More specifically, the user logs in to the website using a video identifier for the content that was previously provided as part of block 602 (612).

After a successful login, the user is redirected to an appropriate page. If a video ID is provided, the user may be directly presented an editing page for the selected video. Alternatively, the user may be presented with a start page as described below, from which the user can select a video for editing. Once selected, the user can edit the raw input (614), select scenes for inclusion in an album (616) and publish the album (618). The publication of the album includes the creation of a high-resolution copy of the selected content (or a streaming version). Next, an order is received for the published album (620). For example, the order can be received by the web front end from the user's client computer 80. The order can be received in other ways including, for example, via electronic mail, Internet Relay Chat, the telephone, and/or the mail. Typically, the order will include information specifying (or otherwise referring or pointing to) a type of product, the published album to incorporate into the product, a quantity of the product being ordered, payment information, and delivery information. After the order has been received, the order is fulfilled (622). For example, the order can be fulfilled by burning or otherwise generating the product (e.g. the DVD or CD) and delivering the product to the customer.

Operational Flow

Figure 7:
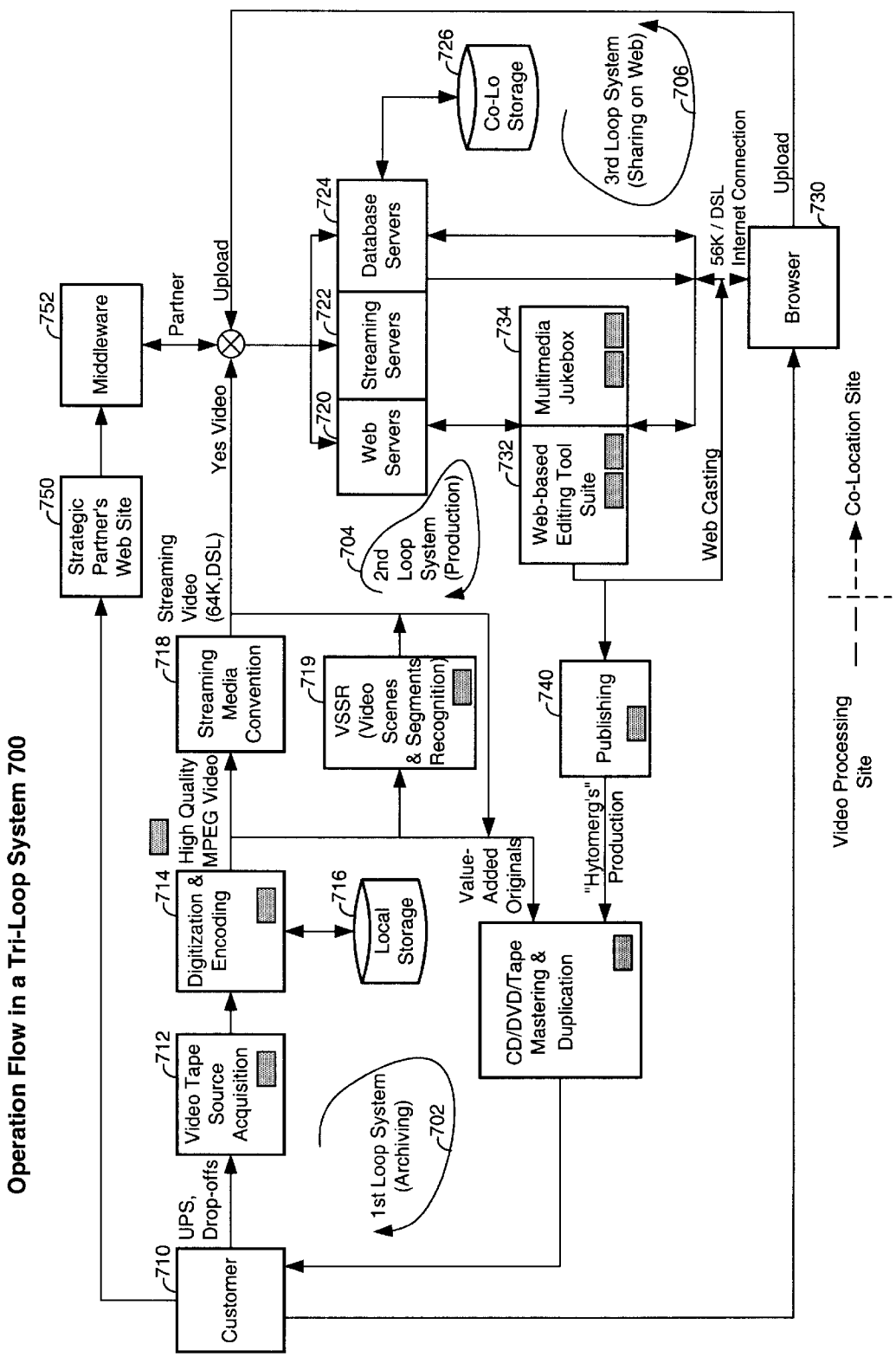
FIG. 7 shows an operational flow for the system of FIG. 1.
Figure 8:
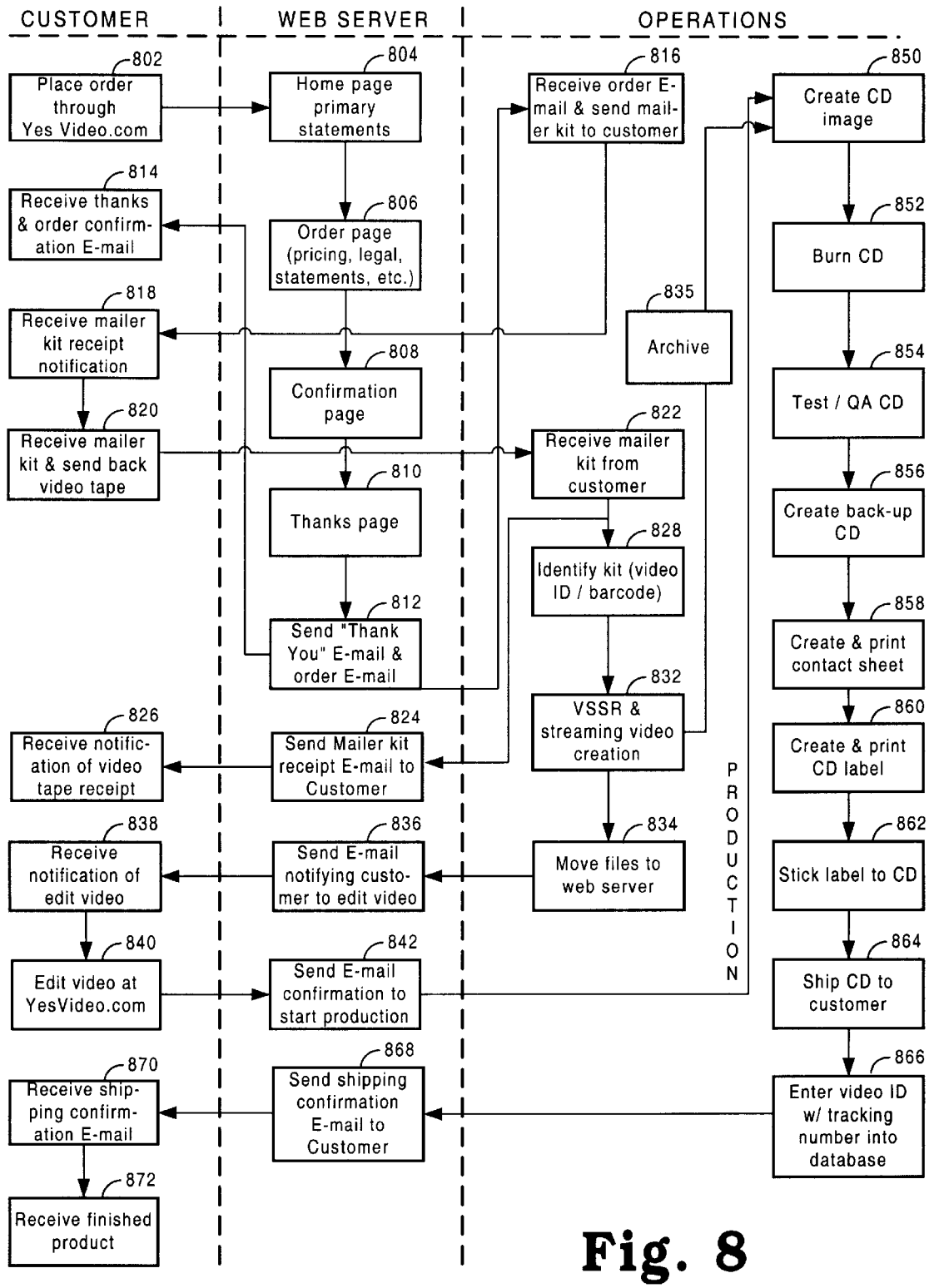
FIG. 8 shows a production flow for the system of FIG. 1.

Referring now to FIG. 7, an operational flow 700 for system 100 is shown. The operational flow includes three loops an archiving loop 702, a production loop 704 and a sharing loop 706.

In the archiving loop, a customer provides content to be processed by the system. The system digitizes and encodes the content and provides a value added function of scene detection. High quality digitized content is stored and a low-resolution version is passed to the sever system for viewing and editing by the customer. More specifically, a customer 710 provides a tape for processing (i.e. video tape source acquisition 712) after which digitization and encoding operations 714 are initiated. The digitized and encoded original content is stored locally 716 for future processing (in the production cycle). The high quality encoded and digitized video is converted 718 to a streaming format. The high quality encoded and digitized video is also processed by a scene detection system to detect individual segments in the original content 719.

In the production loop, the scene detected streaming version of the high resolution content can be edited and organized into an album that can be published. The scene detection information and streaming format data for any received tape is provided to the database server 724. The database server stores the streaming format content and scene detection information in a local storage 726. The customer accesses a browser 730 to view the content. A web server 720 presents the user with web-based editing tools 732 for manipulating the scene detected content as described above to form an album of content. The user can also view scenes by accessing a streaming server 722. The web server 720 can also allow the customer to access other content that can be included in an album for example from a multimedia jukebox 734.

Alternatively, content can be directly provided by a third party to the server system and bypass the archiving loop. That is, the customer can access a strategic partner 750, for example through the Internet, and provide content to the strategic partner. The strategic partner can intake and process content and provide content through middleware 752 to the server system for inclusion in a customer album. The third party can provide: upload content (this content goes into the upload loop) and customer support (e.g., the third party has its own web site and provides support to the customers). When a customer orders a service, the tape can be sent to the third party or directly to the server system. After processing, material can be posted through the third party website.

In each case, the customer produces an album as a finished product in the production loop. When the customer has completed the editing process, the album is published 740. An edit list is produced that describes the final published content. A mastering and duplication service can produce a CD from the edit list. Alternatively, the album can be published on the Web, and cast to one or more recipients.

In the sharing loop, a customer is directed to a particular album that can be viewed. The customer accesses the album, can in turn edit portions, order copies and share the content just as the original producer of the album.

Alternative Implementations

The system above includes a description for locating a fade. The principles disclosed herein are equally well suited for locating other compound scene breaks in video footage. The techniques described can be used to evaluate cuts, dissolves and any other identified transition to determine if a more complex scene break that includes plural transitions should be declared. The location and declaration of these compound scene breaks may allow for the better recognition of scene breaks in the video footage. Each compound break can have an associated rule for marking one or more of the included transitions. For example, the discussion above with respect to dissolve detection, is equally well suited to apply to detection of any type of gradual transition: e.g., detect a wipe by comparing a detected wipe to a synthetically produced wipe. The techniques disclosed are equally well suited to other types of gradual transitions including page flips, tears, iris, pixelation and other transitions.

The present invention has been described in terms of specific embodiments, which are illustrative of the invention and not to be construed as limiting. Other embodiments are within the scope of the following claims.

What is claimed:

1. A method for detecting a scene transition in digitized video data comprising:

determining if a hypothesized dissolve is detected in the video data that ends with a current frame based at least on the current frame and one or more previous frames in the digitized video data, the hypothesized dissolve having a length, a starting and an ending frame;

generating a synthetically produced dissolve spanning the length of the hypothesized dissolve and based on input including the starting and ending frames of the hypothesized dissolve;

comparing the hypothesized dissolve to the synthetically produced dissolve; and marking the hypothesized dissolve as a dissolve only if the hypothesized dissolve is sufficiently similar to the synthetically produced dissolve.

2. The method of claim 1 wherein the step of comparing includes comparing a subset of all of the frames in the hypothesized dissolve to the frames in the synthetically produced dissolve.

3. The method of claim 1 wherein the step of determining further includes evaluating a previously processed frame at a distance a half dissolve from the current frame and a full dissolve from the current frame including determining if the current frame is sufficiently different from both the flame located a half dissolve length ago and a fill dissolve length ago.

4. The method of claim 1 wherein the step of determining includes evaluating previously processed frames, a first frame at a distance a half dissolve from the current frame and a second frame at a distance a full dissolve from the current frame, including determining if the current frame is sufficiently different from both the first and second frames; and marking the hypothesized dissolve only if the current frame is sufficiently different from the first and second frames.

5. The method of claim 4 wherein prior to marking, the method further including a. determining if the hypothesized dissolve overlaps a previously detected dissolve;

b. if so, combining the overlapping dissolves.

6. The method of claim 1 wherein the determining step includes identifying starting, middle and ending frames of the hypothesized dissolve; and comparing the starting, middle and ending frames to determine if each is sufficiently different from the others.

7. The method of claim 1 wherein comparing the hypothesized dissolve to the synthetically produced dissolve includes comparing a color difference between frames of the hypothesized dissolve to frames of the synthetically produced dissolve.

8. The method of claim 1 wherein comparing the hypothesized dissolve to the synthetically produced dissolve includes comparing a motion difference.

9. The method of claim 1 wherein comparing the hypothesized dissolve to the synthetically produced dissolve includes deriving a score representative of similarity of frames of the hypothesized dissolve as compared to frames of the synthetically produced dissolve, the score derived from a mathematical comparison of the frames considering at least one parameter.

10. The method of claim 9 wherein the score is a product of color and motion differences between the respective frames.

11. The method of claim 9 wherein the score is a weighted mean of color and motion differences between the respective frames.

12. A method for detecting a scene transition in digitized video data comprising:

determining if a hypothesized gradual transition is detected in the video data that ends with a current frame based at least on the current frame and one or more previous frames in the digitized video data, the hypothesized gradual transition having a length, a starting frame and an ending frame;

generating a synthetically produced gradual transition spanning the length of the hypothesized gradual transition and based on input including the starting frame and ending frame of the hypothesized gradual transition;

comparing the hypothesized gradual transition to the synthetically produced gradual transition; and marking the hypothesized gradual transition as a gradual transition only if the hypothesized gradual transition is sufficiently similar to the synthetically produced gradual transition.

13. The method of claim 12 wherein the gradual transition is selected from the group of a dissolve, a wipe, a page flip, a tear, an iris transition and a pixelation transition.

14. A computer program product, tangibly stored on a computer-readable medium for detecting a scene transition in digitized video data, comprising instructions operable to cause a programmable processor to:

determine if a hypothesized dissolve is detected in the video data that ends with a current frame based at least on the current frame and one or more previous frames in the digitized video data, the hypothesized dissolve having a length, a starting frame and an ending frame;

generate a synthetic dissolve spanning the length of the hypothesized dissolve and based on input including the starting and ending frames of the hypothesized dissolve;

compare the hypothesized dissolve to the synthetic dissolve; and mark the hypothesized dissolve as a dissolve only if the hypothesized dissolve is sufficiently similar to the synthetic dissolve.

15. The computer program product of claim 14, wherein instructions operable to compare the hypothesized dissolve to the synthetic dissolve include instructions operable to compare a subset of the frames in the hypothesized dissolve to frames in the synthetic dissolve.

16. The computer program product of claim 14, wherein instructions operable to determine further include instructions operable to:

evaluate a previously processed frame at a distance a half dissolve from the current frame and a full dissolve from the current frame to determine if the current frame is sufficiently different from both the frame located a half dissolve length ago and a full dissolve length ago.

17. The computer program product of claim 14, wherein instructions operable to determine include instructions operable to:
  evaluate previously processed frames, a first frame at a distance a half dissolve from the current frame and a second frame at a distance a full dissolve from the current frame, to determine if the current frame is sufficiently different from both the first and second frames; and
  mark as a hypothesized dissolve only if the current frame is sufficiently different from the first and second frames.

18. The computer program product of claim 17, wherein prior to marking, the instructions are further operable to:
  a. determine if the hypothesized dissolve overlaps a previously detected dissolve;
  b. if so, combine the overlapping dissolves.

19. The computer program product of claim 14, wherein instructions operable to determine if a hypothesized dissolve is detected include instructions operable to:
  identify starting, middle and ending frames of the hypothesized dissolve; and
  compare the starting, middle and ending frames to determine if each is sufficiently different from the others.

20. The computer program product of claim 14, wherein instructions operable to compare the hypothesized dissolve to the synthetic dissolve include instructions operable to compare a color difference between frames of the hypothesized dissolve to frames of the synthetic dissolve.

21. The computer program product of claim 14, wherein instructions operable to compare the hypothesized dissolve to the synthetic dissolve include instructions operable to compare a motion difference.

22. The computer program product of claim 14, wherein instructions operable to compare the hypothesized dissolve to the synthetic dissolve include instructions operable to derive a score representative of a similarity of frames of the hypothesized dissolve as compared to frames of the synthetic dissolve, the score derived from a mathematical comparison of the frames considering at least one parameter.

23. The computer program product of claim 22, wherein the score is a product of color and motion differences between the respective frames.

24. The computer program product of claim 22, wherein the score is a weighted mean of color and motion differences between the respective frames.

25. A computer program product, tangibly stored on a computer-readable medium, for detecting a scene transition in digitized video data, comprising instructions operable to cause a programmable processor to:
  determine if a hypothesized gradual transition is detected in the video data that ends with a current frame based at least on the current frame and one or more previous frames in the digitized video data, the hypothesized gradual transition having a length, a starting frame and an ending frame;
  generate a synthetic gradual transition spanning the length of the hypothesized gradual transition and based on input including the starting frame and ending frame of the hypothesized gradual transition;
  compare the hypothesized gradual transition to the synthetic gradual transition; and
  mark the hypothesized gradual transition as a gradual transition only if the hypothesized gradual transition is sufficiently similar to the synthetic gradual transition.

26. The computer program product of claim 25, wherein the gradual transition is selected from the group of a dissolve, a wipe, a page flip, a tear, an iris transition and a pixelation transition.

27. A method for detecting a scene transition in digitized video data, comprising:
  detecting that a hypothesized dissolve is present;
  identifying where the hypothesized dissolve starts and ends, including identifying starting and ending frames and a length of the hypothesized dissolve;
  generating a synthetic dissolve using the starting frame, ending frame and length of the hypothesized dissolve;
  comparing one or more frames included in the hypothesized dissolve to frames included in the synthetic dissolve; and
  marking the hypothesized dissolve as a dissolve only if the hypothesized dissolve is sufficiently similar to the synthetic dissolve.

28. The method of claim 27, wherein generating the synthetic dissolve comprises performing a cross-fade on the starting and ending frames of the hypothesized dissolve.

29. The method of claim 27, wherein comparing frames in the hypothesized dissolve to frames in the synthetically produced dissolve includes deriving a score representative of a similarity of the compared frames, the score derived from a mathematical comparison of the frames considering at least one parameter.

30. The method of claim 29, wherein the synthetic dissolve includes synthetic motion, the method further comprising determining a type and amount of synthetic motion based on a motion estimation of video data on either side of the hypothesized dissolve.

31. The method of claim 30, wherein the score is a product of color and motion differences between the compared frames.

32. The method of claim 30, wherein the score is a weighted mean of color and motion differences between the compared frames.

33. The method of claim 27, wherein if the hypothesized dissolve sufficiently overlaps a previously hypothesized dissolve, the method further comprising:
  determining if the previously hypothesized dissolve is short enough to allow extension; and
  if so, combining the hypothesized dissolved with the previously hypothesized dissolve; and
  marking the combined dissolve as a dissolve.

34. The method of claim 27, wherein the step of detecting that a hypothesized dissolve is present includes comparing a current frame to one or more previous frames.

35. A computer program product, tangibly stored on a computer-readable medium, for detecting a scene transition in digitized video data, comprising instructions operable to cause a programmable processor to:
  detect that a hypothesized dissolve is present;
  identify where the hypothesized dissolve starts and ends, including identifying starting and ending frames and a length of the hypothesized dissolve;
  generate a synthetic dissolve using the starting frame, ending frame and length of the hypothesized dissolve;
  compare one or more frames included in the hypothesized dissolve to frames included in the synthetic dissolve; and
  mark the hypothesized dissolve as a dissolve only if the hypothesized dissolve is sufficiently similar to the synthetic dissolve.

36. The computer program product of claim 35, wherein instructions operable to generate the synthetic dissolve comprise instructions operable to perform a cross-fade on the starting and ending frames of the hypothesized dissolve.

37. The computer program product of claim 35, wherein instructions operable to compare frames in the hypothesized dissolve to frames in the synthetically produced dissolve include instructions operable to derive a score representative of a similarity of the compared frames, the score derived from a mathematical comparison of the frames considering at least one parameter.

38. The computer program product of claim 37, wherein the synthetic dissolve includes synthetic motion, the instructions further operable to determine a type and amount of synthetic motion based on a motion estimation of video data on either side of the hypothesized dissolve.

39. The computer program product of claim 38, wherein the score is a product of color and motion differences between the compared frames.

40. The computer program product of claim 39, wherein the score is a weighted mean of color and motion differences between the compared frames.

41. The computer program product of claim 35, the instructions further operable to, if the hypothesized dissolve sufficiently overlaps a previously hypothesized dissolve:

determine if the previously hypothesized dissolve is short enough to allow extension;

if so, combine the hypothesized dissolved with the previously hypothesized dissolve; and mark the combined dissolve as a dissolve.

42. The computer program product of claim 35, wherein instructions operable to detect that a hypothesized dissolve is present include instructions operable to compare a current frame to one or more previous frames.

* * * * *